United States Patent
Ojiro et al.

(10) Patent No.: US 8,882,228 B2
(45) Date of Patent: Nov. 11, 2014

(54) IMAGE PROCESSING APPARATUS, INKJET PRINTING APPARATUS AND IMAGE PROCESSING METHOD

(75) Inventors: Hinako Ojiro, Wynnewood, PA (US); Yuji Konno, Kawasaki (JP); Takeshi Yazawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 13/613,657

(22) Filed: Sep. 13, 2012

(65) Prior Publication Data

US 2013/0084439 A1    Apr. 4, 2013

(30) Foreign Application Priority Data

Sep. 29, 2011    (JP) .................................. 2011-214848

(51) Int. Cl.
B41J 2/205 (2006.01)
H04N 1/54 (2006.01)
B41J 2/21 (2006.01)

(52) U.S. Cl.
CPC .................. *H04N 1/54* (2013.01); *B41J 2/2114* (2013.01)
USPC .................................. 347/15; 358/1.2; 358/1.9

(58) Field of Classification Search
USPC ........................................ 347/15; 358/1.2, 1.9
See application file for complete search history.

(56) References Cited

U.S. PATENT DOCUMENTS

| | | | |
|---|---|---|---|
| 6,322,187 B1 * | 11/2001 | Wyble | 347/15 |
| 6,341,833 B1 | 1/2002 | Liu et al. | |
| 6,572,212 B2 | 6/2003 | Konno et al. | |
| 6,779,865 B2 * | 8/2004 | Shibata et al. | 347/19 |
| 6,877,833 B2 | 4/2005 | Teshigawara et al. | |
| 7,090,332 B2 | 8/2006 | Konno et al. | |
| 7,338,146 B2 * | 3/2008 | Morikoshi | 347/29 |
| 7,408,676 B2 | 8/2008 | Yazawa et al. | |
| 7,819,497 B2 | 10/2010 | Konno et al. | |
| 8,027,058 B2 | 9/2011 | Jinno | |
| 2002/0171710 A1 | 11/2002 | Franzke | |
| 2005/0200866 A1 | 9/2005 | Hoshii et al. | |
| 2008/0079966 A1 | 4/2008 | Thomas | |
| 2012/0050362 A1 | 3/2012 | Iritani et al. | |
| 2012/0050370 A1 | 3/2012 | Iritani et al. | |

FOREIGN PATENT DOCUMENTS

| | | | |
|---|---|---|---|
| JP | 2001-138555 A | 5/2001 | |
| JP | 2007-288270 A | 11/2007 | |

OTHER PUBLICATIONS

Office Action in Chinese Application No. 201210365718.1, dated Jun. 27, 2014.

* cited by examiner

*Primary Examiner* — Lamson Nguyen
(74) *Attorney, Agent, or Firm* — Fitzpatrick, Cella, Harper & Scinto

(57) ABSTRACT

The use amount of clear ink is set to minimize the hue difference $\Delta\theta s-d$ from each of the colors corresponding to input signal values. The use amount of the clear ink to provide the minimum hue difference $\Delta\theta s-d$ is varied depending on the use amount of color ink used for the color corresponding to the input signal value. A color conversion table having output values of the use amount and ink color data corresponding to the use amount is set. The color conversion in such a relationship is performed, whereby the bronzing color is recognized as a color close to the print color. As a result, undesired bronzing is lessened, so that degradation in image quality can be suppressed.

19 Claims, 22 Drawing Sheets

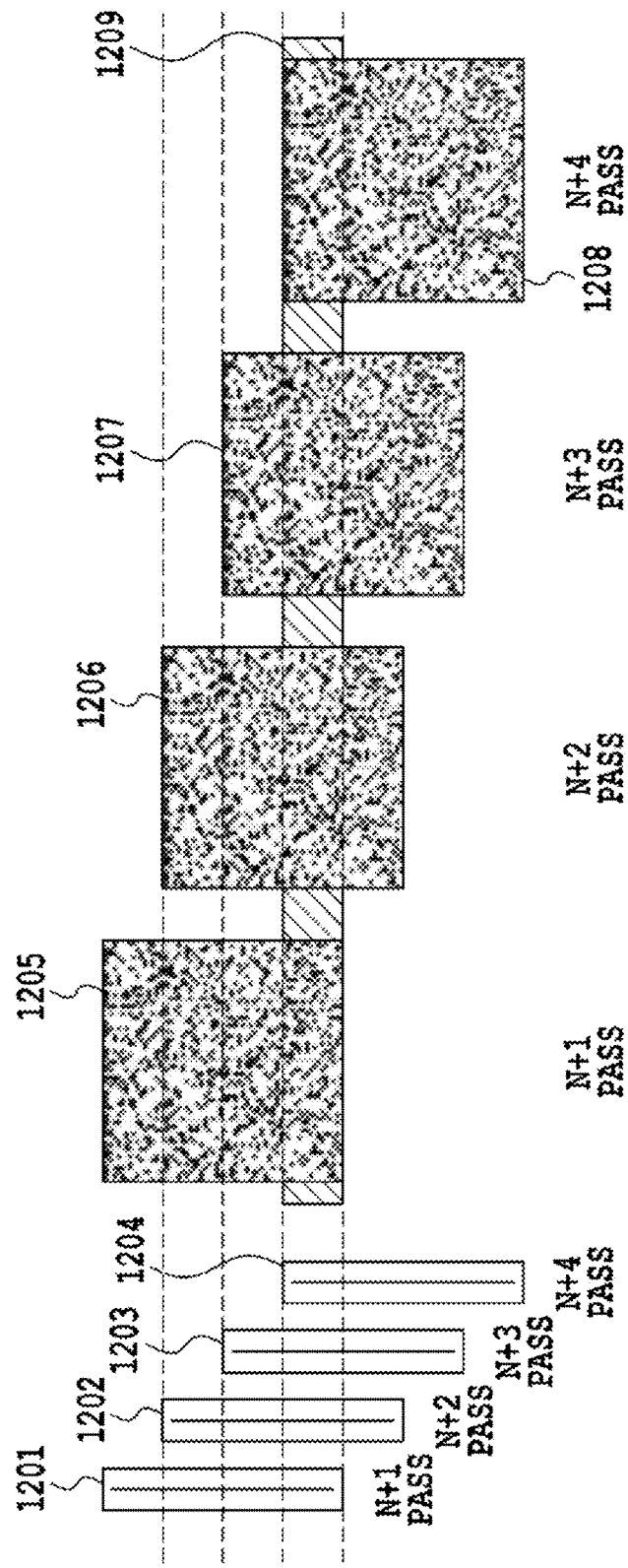

| | INPUT SIGNAL | | | MAINLY USED INK | PRINT COLOR | | | | BRONZING COLOR | | | | HUE DIFFERENCE |
|---|---|---|---|---|---|---|---|---|---|---|---|---|---|
| | R | G | B | | a* | b* | θ_d | c*_d | Sa* | Sb* | θ_s | c*_s | Δθ_s-d |
| A | 0 | 64 | 64 | C | -17 | -18 | 226 | 25 | 27 | 8 | 17 | 28 | 151 |
| B | 64 | 0 | 64 | M | 31 | -8 | 346 | 32 | 5 | 22 | 77 | 23 | 91 |
| C | 64 | 64 | 0 | Y | 1 | 27 | 88 | 27 | 1 | 3 | 80 | 3 | 8 |

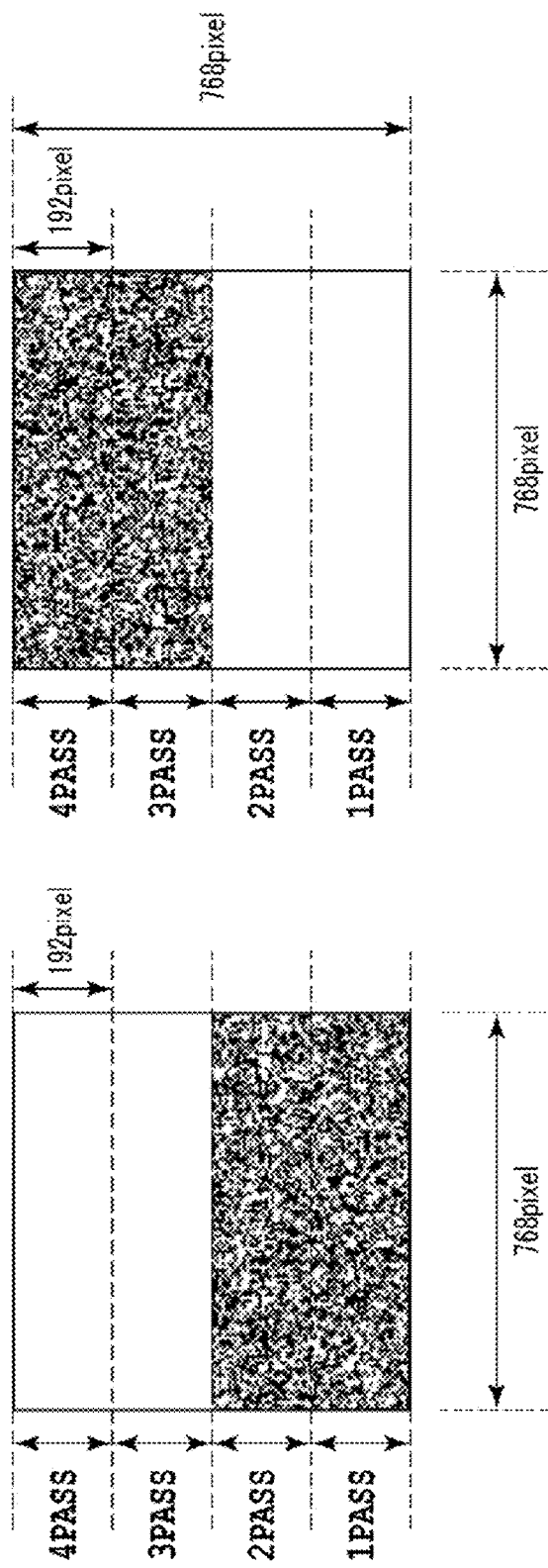

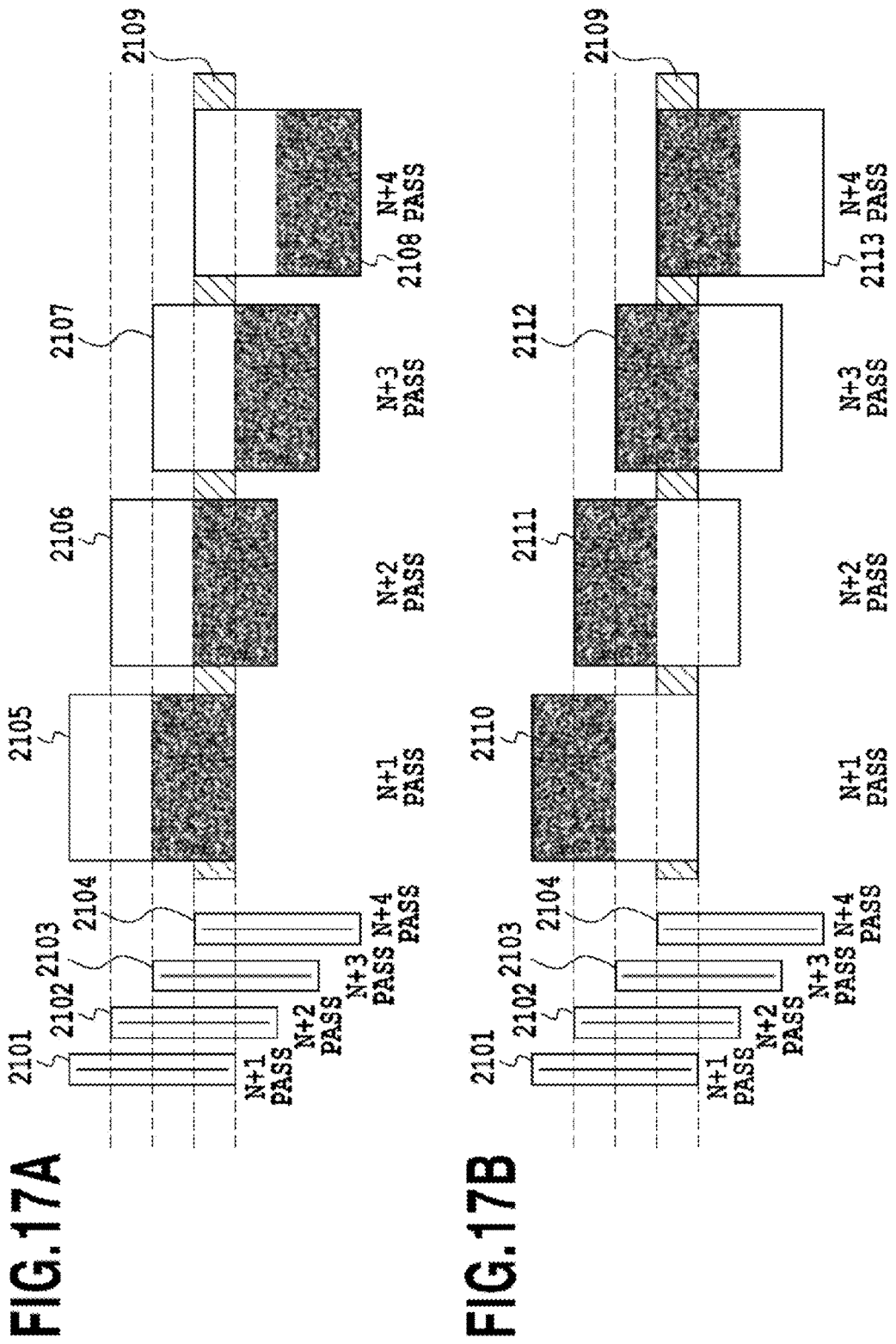

IMAGE PROCESSING APPARATUS, INKJET PRINTING APPARATUS AND IMAGE PROCESSING METHOD

BACKGROUND OF THE INVENTION

1. Field of the Invention

The present invention relates to an image processing apparatus, an inkjet printing apparatus and an image processing method, and more particularly, to a technique for suppressing degradation in image quality caused by a bronzing phenomenon observed on a printed image.

2. Description of the Related Art

In inkjet printing, particularly distinguishing phenomena occurring in use of pigment ink for a glossy print medium includes a phenomenon in which an illumination image reflected on the surface of a printed material takes a color (hereinafter referred to as a "bronzing phenomenon"). For example, in the use of a cyan pigment, the illumination image becomes reddish, which contributes to a significant loss in visual image quality. A known method for lessening such a bronzing phenomenon is lamination of a clear film onto the print surface to prevent pigment particles from being exposed at the surface of a print medium. However, having the lamination construction gives rise to disadvantages of increased device costs, increased time required for the lamination process, and the like.

To address it, Japanese Patent Laid-Open No. 2001-138555 discloses a technique for controlling a ratio of used ink to lessen the bronzing phenomenon. The technique is the method where the presence or absence of occurrence of the bronzing phenomenon is determined from the lightness of an input image and a ratio of used ink, and then the ratio of ink to be used is changed based on the determination result, thus lessening the bronzing phenomenon.

In general, when viewing a printed material, the viewer views light reflected off the printed material upon which light is incident from a light source. Then, such a viewed color varies by a viewing angle. FIG. 1 is a diagram illustrating difference between two reflected lights when a viewer views a printed material at two different angles. In FIG. 1, the reflected light viewed in direction A is specular reflected light viewed in a specular direction with respect to the light source, in which a light source image reflected on the printed material is viewed. On the other hand, the reflected light viewed in direction B is light reflected after passing through the interior of the printed material, that is, diffused light, in which color reproduced by color materials (hereinafter referred to as "print color") is viewed.

In the viewing in the direction A of such two viewing angles, a different color reflection of the light source from the original color of the light source may be possibly recognized, which is perceived as the bronzing phenomenon. In addition to the event of such a reflection of the light source, the two types of the reflected lights as shown in FIG. 1 may be simultaneously viewed. As a result, for example, an image of a different color from the original print color may possibly be seen. This is also recognized as the bronzing phenomenon.

If the original print color differs from the color produced by the bronzing phenomenon (hereinafter referred to as a "bronzing color") as described above, such a bronzing color is perceived as an undesired color, resulting in degraded image quality of the printed material. To address it, in Japanese Patent Laid-Open No. 2001-138555, the ratio of ink used is changed to lessen the bronzing phenomenon as described earlier. However, degradation in image quality caused by a difference between the bronzing color and the print color cannot be adequately controlled. That is, even when the bronzing color or the developed color is processed to become indistinct, if the difference of the bronze color from the print color is large, the large difference itself is noticeably recognized, becoming a factor that degrades the image quality.

SUMMARY OF THE INVENTION

An object of the present invention is to provide an image processing apparatus, an inkjet printing apparatus, and an image processing method, which are capable of suppressing degradation in image quality caused by a difference between a print color and a bronzing color.

In a first aspect of the present invention, there is provided an image processing apparatus for forming an image by predetermined color of ink and clear ink that is a clear material and includes a resin, the predetermined color of ink and the clear ink being applied to a print medium with use of an applying unit, the apparatus comprising: a determining unit configured to determine applying amounts of the ink and the clear ink to the print medium; and a control unit configured to cause the applying unit to apply the ink and the clear ink to the print medium, based on the applying amounts determined by the determining unit, wherein the determining unit determines the applying amounts so that a hue difference in a L*a*b* space is equal to or less than 90 degrees between a print color measured in a reflected light that does not include a specular reflected light and a bronzing color which is the print color measured in a reflected light that includes the specular reflected light, in a case of performing measuring of the image under a light, the image being formed by applying a predetermined applying amount of the ink and a predetermined applying amount of the clear ink.

In a second aspect of the present invention, there is provided an image processing method of forming an image by predetermined color of ink and clear ink that is a clear material and includes a resin, the predetermined color of ink and the clear ink being applied to a print medium with use of an applying unit, the method comprising: a determining step of determining applying amounts of the ink and the clear ink to the print medium; and a control step of causing the applying unit to apply the ink and the clear ink to the print medium, based on the applying amounts determined by the determining step, wherein the determining step determines the applying amounts so that a hue difference in a L*a*b* space is equal to or less than 90 degrees between a print color measured in a reflected light that does not include a specular reflected light and a bronzing color which is the print color measured in a reflected light that includes the specular reflected light, in a case of performing measuring of the image under a source, the image being formed by applying a predetermined applying amount of the ink and a predetermined applying amount of the clear ink.

With the aforementioned structure, suppression of the degradation in image quality caused by the difference between the print color and the bronzing color can be achieved.

Further features of the present invention will become apparent from the following description of exemplary embodiments (with reference to the attached drawings).

BRIEF DESCRIPTION OF THE DRAWINGS

FIG. 10 is diagram illustrating a multi-pass printing operation using the mask pattern shown in FIG. 9;

FIGS. 16A and 16B are diagrams respectively showing examples of a mask pattern used in printing of the color ink and a mask pattern used in printing of the clear ink;

FIGS. 17A and 17B are diagrams illustrating a multi-pass printing operation using the masks shown in FIG. 16A and FIG. 16B;

DESCRIPTION OF THE EMBODIMENTS

Embodiments of the present invention will be described below in detail with reference to the accompanying drawings.
(Method for Evaluating Bronzing)

Figure 2:
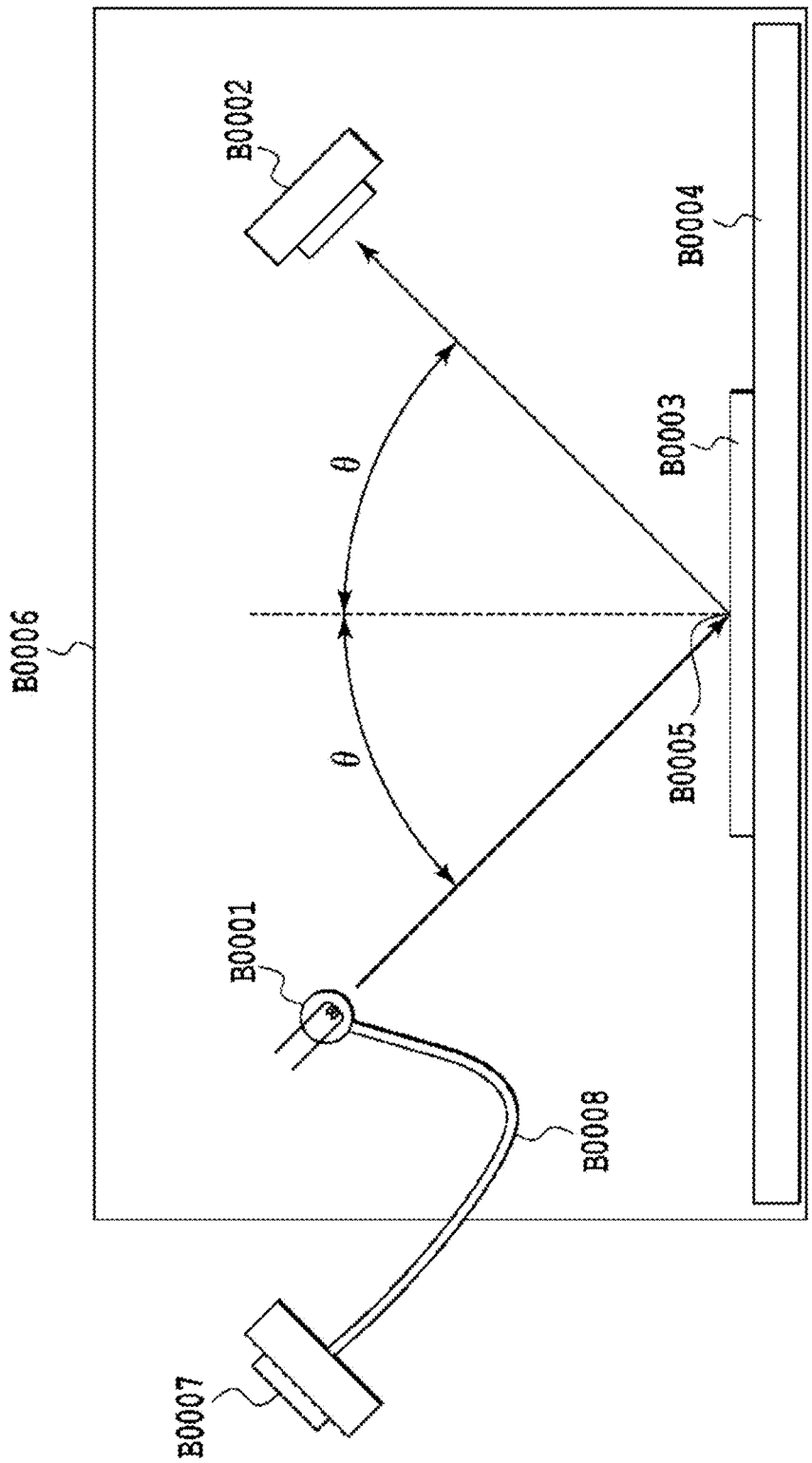
FIG. 2 is a schematic diagram of the measurement system for measuring a bronzing phenomenon.

The bronzing phenomenon can be measured by use of, for example, a gonio-spectrophotometric color measurement system (GCMS-4) produced by Murakami Color Research Laboratory CO., Ltd. FIG. 2 is a schematic diagram of the measurement system. As illustrated in FIG. 2, light is emitted toward a printed image from a direction of θ=45°, and a specular reflected light is received from a direction of θ=45° in the reverse direction. Then, the spectral intensity of the received specular reflected light is measured and a saturation of the specular reflected light is calculated from the measured spectral intensity. The lower the color intensity of the specular reflected light, the lower the saturation of the specular reflected light becomes.

FIG. 2 shows an illumination light source B0001 illuminating an image printed on a print medium B0003, and a photo detector B0002 detecting light reflected from the image on the print medium B0003. The photo detector B0002 is positioned in the direction inclined at the same angle θ as that of the illumination light source in the opposite side thereof on the basis of the normal direction of the print medium B0003, that is, along the specular reflection direction. A fixing table B0004 is provided for fixing the print medium B0003. A measure point B0005 is to be measured by the photo detector B0002. A light-shield cover B0005 is provided for blocking light from the outside.

The following is a method for calculating color attributes from the specular reflected light thus measured. A spectral intensity of the specular reflected light from the image on the print medium B0003, which is measured by the photo detector B0002, is represented by the following expression.

$$R_X(\lambda) \qquad \text{Expression 1}$$

Based on this intensity, tri-stimulus values X×Y×Z× of the specular reflected light are calculated. Then, a L*a*b* value of the specular reflected light, that is, a color shown by the specular reflected light is obtained from the tri-stimulus value of the specular reflected light and the tri-stimulus value of the light from the illumination light source B0001 on the basis of JIS Z 8729.

Figure 3:
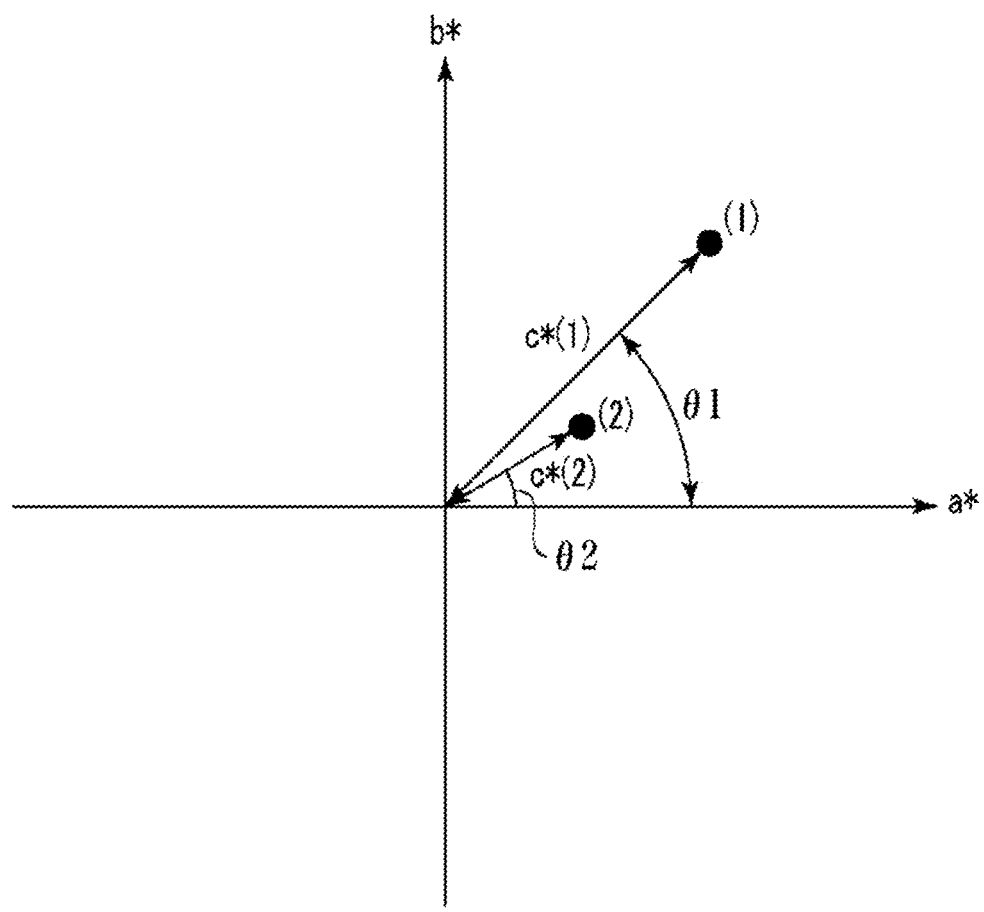
FIG. 3 is a diagram showing plots, on the a*b* plane, of two examples of colors shown by the specular reflected light obtained by measuring the print image by the measurement system shown in FIG. 2.

FIG. 3 is a diagram showing plots, on the a*b* plane, of two examples of colors shown by the specular reflected light obtained by measuring a printed image by the aforementioned measuring method. In FIG. 3, color (1) is a color giving rise to a relatively distinct bronzing phenomenon, while color (2) is a color giving rise to a relatively indistinct bronzing phenomenon. The C* (1) in color (1) and C* (2) in color (2) are respectively the results of calculations of saturation $C^* = \sqrt{(a^{*2}+b^{*2})}$ from L*a*b* values of the respective colors, in which the larger the value, the higher the saturation of the bronzing color, meaning that the bronzing phenomenon tends to be easily distinct. In FIG. 3, θ1, θ2 represent hues which are obtained as θ=tan−1 (a*/b*) from L*a*b* values of the bronzing values.

As described above, in the present embodiment, the bronzing color is identified by obtaining the hue and saturation of the bronzing color of specular reflected light on a L*a*b* space. On the other hand, regarding the print color of an image, the print color which is the original color of the printed image is identified by measuring the diffused light.

A printed image as the measuring object is formed by applying a predetermined amount of ink, which is a measuring object, to the print medium B0003. More specifically, a predetermined amount of the ink of measuring object and a predetermined amount of clear ink (described later) are applied to the print medium.
(Apparatus Structure)

Figure 4:
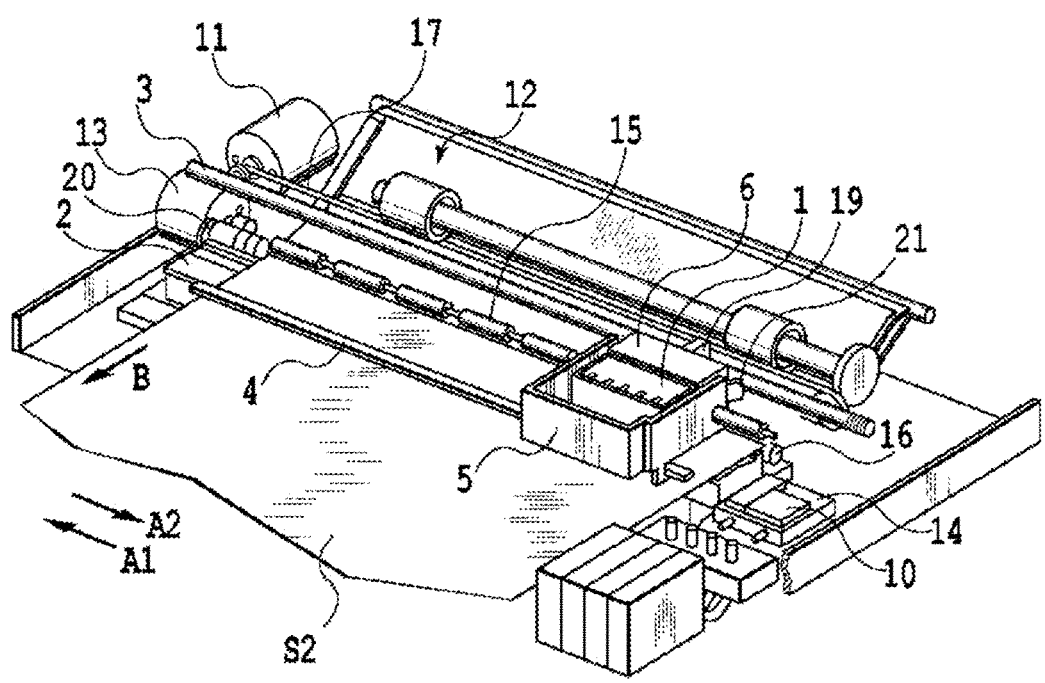
FIG. 4 is a perspective view illustrating the structure of a main portion of an inkjet printing apparatus according to an embodiment of the present invention.

FIG. 4 is a perspective view showing the structure of a main part of an inkjet printing apparatus according to an embodiment of the present invention. In FIG. 4, a print medium S2 is fed from a feeder tray 12 to a printing portion. Then, while the print medium is conveyed intermittently in the direction shown by arrow B, an image is printed on the print medium. Then, the print medium is discharged to a discharge tray upon completion of printing. In the printing portion, a print head 1 mounted on a carriage 5 reciprocates along a guide rail 4 in directions of arrows A1 and A2, while ejecting ink from nozzles of the print head 1 to form an image on the print medium S2. The print head 1 has a plurality of nozzle groups respectively provided for different ink colors. The print head 1 includes the nozzle groups for ejection of inks of eight colors in total, clear ink (CL, also referred to as "processing ink" in the present specification) and color inks of cyan (C), magenta (M), yellow (Y), light cyan (LC), light magenta (LM), black (K) and gray (Gy). The inks of the respective colors are independently stored in the respective ink tanks (not shown) and supplied to the print head 1 during ejection operation.

Figure 5:
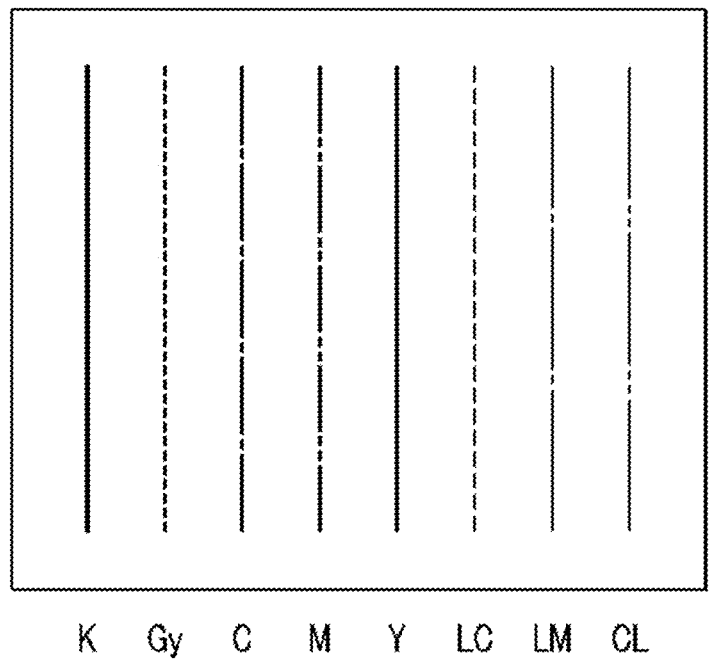
FIG. 5 is a schematic diagram of the arrangement of nozzle arrays (nozzle groups) ejecting 8-color inks in the print head 1 shown in FIG. 4.

FIG. 5 is a schematic diagram of the arrangement of nozzle arrays (nozzle groups) ejecting the inks of the eight colors in the print head 1. The amount of ink ejected from each nozzle in the print head 1 is approximately equally 3 pl. The clear ink CL of the eight color inks is favorably composed of a resin material and is used mainly to lessen a difference between an original print color of an image to be printed by landing-on of each color ink and a bronzing color, as described later. Specifically, the clear ink forms an ink coating layer, and the percentage of coating and a thickness of the clear ink layer are controlled to lessen the difference between the print color and the bronzing color.

Returning back to FIG. 4, the ink tanks and the print head 1 are integrally formed to form part of a head cartridge 6 which is detachably mounted on the carriage 5. A drive force of a carriage motor 11 is transferred to the carriage 5 by a timing belt 17, thus to cause the carriage 5 to reciprocate along a guide shaft 3 and the guide rail 4 in the directions of arrows A1 and A2 (in the main scan direction). During the carriage movement, a carriage position is detected by an encode sensor 21 provided in the carriage 5 to read a linear scale 19 provided along the direction of carriage movement. Printing is produced on the print medium during the reciprocating movement. In this process, the print medium S2 is conveyed on a platen 2 while being held between a conveying roller 16 and pinch rollers 15.

In the printing operation, every time the print head 1 on the carriage 5 prints an image corresponding to one scan in the A1 direction, a conveying motor 13 operates the conveying roller 16 via a linear wheel 20. Thereupon, the print medium S2 is conveyed by a predetermined length toward the direction of arrow B which is the sub scan direction. Then, while the carriage 5 scans in the A2 direction, printing is performed on the print medium S2. A head cap 10 and a recovery unit 14 are located in a home position as shown in FIG. 4, so that a recovery process of the print head 1 is intermittently performed as necessary.

By repeating the above-described operation, an image corresponding to one sheet of the print medium is printed, whereupon the print medium is discharged, thus completing the printing of one sheet.

Figure 6:
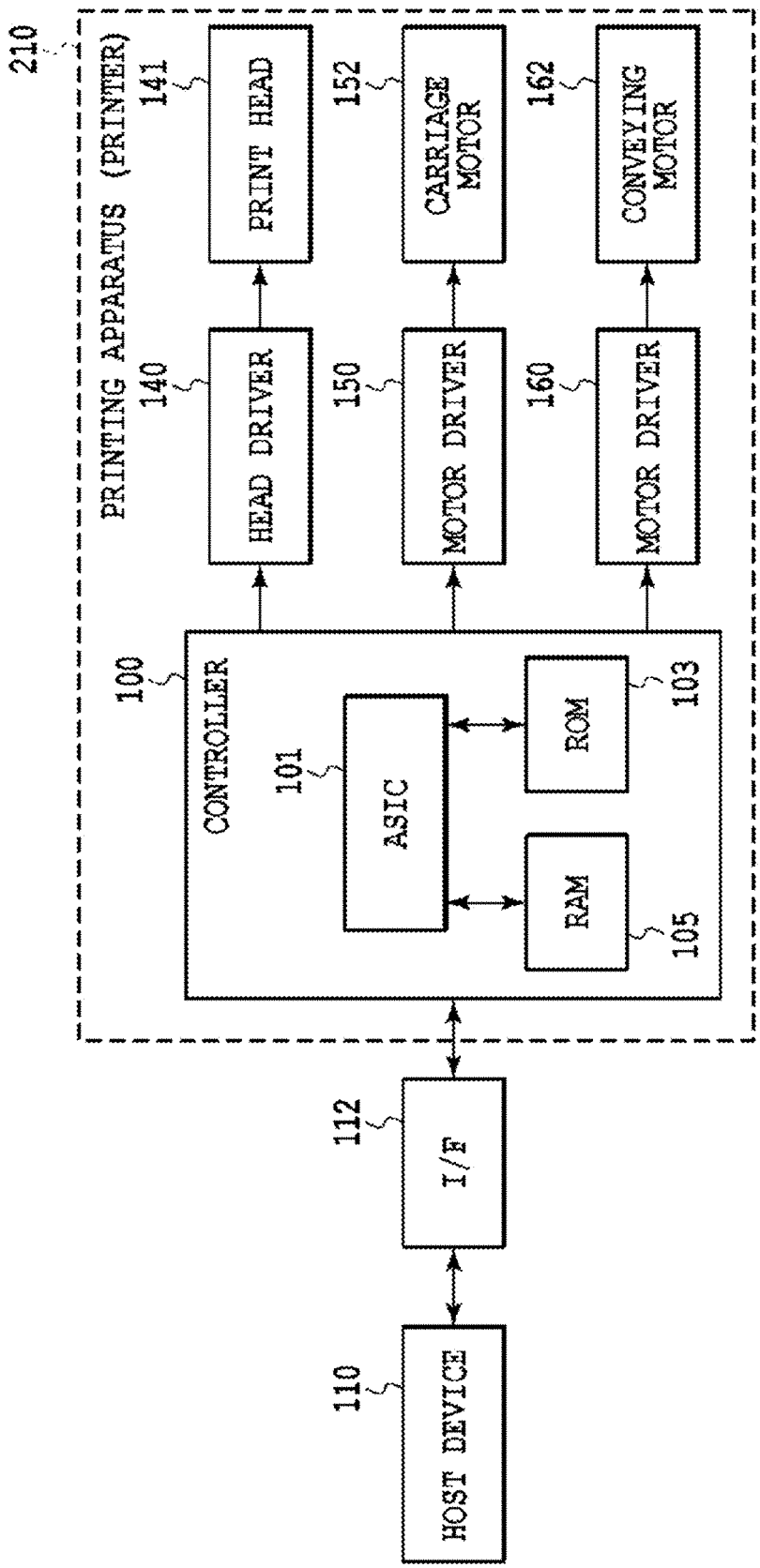
FIG. 6 is a block diagram showing the control configuration in the inkjet printing apparatus shown in FIG. 4.

FIG. 6 is a block diagram showing the control configuration in the inkjet printing apparatus according to the present embodiment. A controller 100 is a main control unit, which includes an ASIC 101 in, for example, a micro-computer form, a ROM 103, and a RAM 105. The ROM 103 stores dot arrangement patterns, mask patterns, and other fixed data. The RAM 105 includes an area for expanding image data from the host device, a work area and the like. The ASIC 101 reads programs from the ROM 103, and controls the operation of printing onto the print medium on the basis of image data.

The host device 110 is a supply source of image data, which not only may be a computer performing creation, processing and the like of data on an image and the like involved in printing, but also may take a form of a reader unit for reading an image or the like. The host device 110 performs image processing including color conversion processing according to an embodiment of the present invention, which will be described later with reference to FIG. 7. Then, the image data generated through the image processing, and other commands, status signals and the like are transmitted to and received from a controller 100 of the printing apparatus via an interface (I/F) 112.

In the printing apparatus, a head driver 140 drives the print head 1 on the basis of print data and the like. A motor driver 150 drives the carriage motor 11 and a motor driver 160 drives the conveying motor 13.

(Ink Composition)

Now, components forming pigment ink used in the inkjet printing apparatus according to the present embodiment will be described.

Aqueous Medium

Ink employed in the present invention preferably uses aqueous medium containing water and a water-soluble organic solvent. A content (mass %) of the water-soluble organic solvent in ink ranges preferably from 3.0 mass % or higher to 50.0 mass % or lower with respect to the total mass of the ink. A content (mass %) of water in ink ranges preferably from 50.0 mass % or higher to 95.0 mass % or lower with respect to the total mass of the ink.

To be more specific, the following are preferable examples that can be employed as the water-soluble organic solvent: Alkyl alcohols containing 1 to 6 carbon atoms such as methanol, ethanol, propanol, propanediol, butanol, butanediol, pentanol, pentanediol, hexanol, hexanediol, and the like; Amides such as dimethylformamide, dimethylacetamide, and the like; Ketones or ketoalcohols such as acetone, diacetone alcohols and the like; Ethers such as tetrahydrofuran, dioxane and the like; Polyalkylene glycols having a mean molecular weight of 200, 300, 400, 600, 1000 and the like such as polyethylene glycol, polypropylene glycol and the like; Alkylene glycols having alkylene group with 2 to 6 carbon atoms such as ethylene glycol, propylene glycol, butylene glycol, triethylene glycol, 1,2,6-hexanetriol, thiodiglycol, hexylene glycol, diethylene glycol, and the like; Lower alkyl ether acetate such as polyethylene glycol monomethyl ether acetate and the like; Lower alkyl ethers of polyhydric alcohol such as glycerin, ethylene glycol monomethyl (or ethyl)ether, diethylene glycol methyl (or ethyl)ether, triethylene glycol monomethyl (or ethyl)ether, and the like; N-methyl-2-pyrrolidone; 2-pyrrolidone; 1,3-dimethyl-2-imidazolidinone; and the like. Further, preferably, deionized water (ion-exchanged water) is used as water.

Pigment

Using carbon blacks or organic pigments as pigments is preferable. A content (mass %) of pigment in ink ranges preferably from 0.1 mass % or higher to 15.0 mass % or lower with respect to the total mass of the ink.

For a black ink, carbon black such as furnace black, lamp black, acetylene black, channel black and the like is preferably used as pigments. Specifically, for example, the following commercially available supplies and the like can be employed: Raven 7000, 5750, 5250, 5000ULTRA, 3500, 2000, 1500, 1250, 1200, 1190ULTRA-II, 1170 and Raven 1255 (all of which are produced by Columbian Chemicals);

Black Pearls L, Regal 330R, Regal 400R, Regal 660R, Mogul L, Monarch 700, 800, 880, 900, 1000, 1100, 1300, 1400 and Monarch 2000, Valcan XC-72R (all of which are produced by Cabot); Color Black FW1, FW2, FW2V, FW18, FW200, S150, S160 and Color Black S170, Printex 35, U, V, 140U, and Printex 140V, Special Black 6, 5, 4A and Special Black 4 (all of which are produced by Degussa); and No. 25, No. 33, No. 40, No. 47, No. 52, No. 900, No. 2300, MCF-88, MA600, MA7, MA8 and MA100 (all of which are produced by Mitsubishi Chemical Corporation). Carbon black newly prepared for the present invention may be employed. It should be understood that the present invention is not limited to the above examples, and any of carbon blacks in the related art may be employed. The black ink is not limited to such carbon black. Magnetic micro particles such as magnetite, ferrite and the like, titanium black, and the like may be employed as pigment.

The following are concrete examples that can be employed as the organic pigments: Water-insoluble azo pigments such as toluidine red, toluidine maroon, hansa yellow, benzidine yellow, pyrazolone red and the like; Water-soluble azo pigments such as lithol red, helio Bordeaux, pigment scarlet, permanent red 2B and the like; Derivatives from vat dyes such as allizarine, indanthron, thioindigo maroon and the like; Phthalocyanine-based pigments such as phthalocyanine blue, phthalocyanine green and the like; Quinacridone-based pigments such as quinacridone red, quinacridone magenta and the like; Perylene-based pigments such as perylene red, perylene scarlet and the like; Isoindolinone-based pigments such as isoindolinone yellow, isoindolinone orange and the like; Imidazolone-based pigments such as benzimidazolone yellow, benzimidazolone orange, benzimidazolone red and the like; Pyranthrone-based pigments such as pyranthrone red, pyranthrone orange and the like; Indigo-based pigments; Condensed azo-based pigments; Thioindigo-based pigments; Diketopyrrolopyrrole-based pigments; Flavanthrone yellow; Acylamide yellow; Quinophtalone yellow; Nickel azo yellow; Copper azomethine yellow; Perinone orange; Anthrone orange; Dianthraquinonyl red; Dioxazine violet and the like. It should be understood that the present invention is not limited to the above examples.

Using color index (C.I.) numbers to represent the organic pigments, for example, the following can be employed. C.I. pigment yellow 12, 13, 14, 17, 20, 24, 74, 83, 86, 93, 97, 109, 110, 117, 120, 125, 128, 137, 138, 147, 148, 150, 151, 153, 154, 166, 168, 180, 185 and the like. C.I. pigment orange 16, 36, 43, 51, 55, 59, 61, 71 and the like. C.I. pigment red 9, 48, 49, 52, 53, 57, 97, 122, 123, 149, 168, 175, 176, 177, 180, 192, 215, 216, 217, 220, 223, 224, 226, 227, 228, 238, 240, 254, 255, 272 and the like. C.I. pigment violet 19, 23, 29, 30, 37, 40, 50 and the like. C.I. pigment blue 15, 15:1, 15:3, 15:4, 15:6, 22, 60, 64 and the like. C.I. pigment green 7, 36 and the like. C.I. pigment brown 23, 25, 26 and the like. It should be understood that the present invention is not limited to the above examples.

Dispersant

Any of dispersants can be used to disperse such pigments in an aqueous medium, as long as it is water-soluble resin. Preferable dispersants of them have a weight mean molecular weight ranging from 1,000 or more to 30,000 or less, and more preferably, from 3,000 or more to 15,000 or less. A content (mass %) of dispersant in ink ranges preferably from 0.1 mass % or higher to 5.0 mass % or lower with respect to the total mass of the ink.

Specifically, the following are examples that can be used as dispersants: styrene, vinylnaphthalene, aliphatic alcohol esters of $\alpha,\beta$-ethylenically unsaturated carboxylic acids, acrylic acid, maleic acid, itaconic acid, fumaric acid, vinyl acetate, vinyl pyrrolidone, acrylamide, and polymers containing derivatives of them as monomers. Note that one or more monomers which compose a polymer are preferably hydrophilic monomers, and a block copolymer, random copolymer, graft copolymer or salts of them may also be used. Natural resins such as rosin, shellac, starch and the like may be used. Preferably, the resins are soluble in a base-dissolved aqueous solution, that is, are alkali soluble resins.

Surfactant

For adjustment of the surface tension of ink forming the ink set, the use of a surfactant such as an anionic surfactant, nonionic surfactant, ampholytic surfactant or the like is preferable. Specifically, polyoxyethylene alkyl ether, polyoxyethylene alkyl phenols, acetylene glycol compounds, acetylene glycol ethylene oxide adducts, or the like can be used.

Other Components

In addition to the above components, the ink forming the ink set may contain a moisturizing solid content such as urea, urea derivatives, trimethylolpropane, thrimethylolethane and the like, for moisture retention. A content (mass %) of moisturizing solid content in ink ranges preferably from 0.1 mass % or higher to 20.0 mass % or lower, more preferably, from 3.0 mass % or higher to 10.0 mass % or lower with respect to the total mass of the ink. The ink forming the ink set may contain various additives such as a pH adjuster, anti-corrosive agent, preservative, mildewproofing agent, antioxidant, anti-reduction agent, evaporation accelerator and the like, in addition to the aforementioned components as necessary.

Next, the ink used in the present embodiment will be described more concretely. The preset invention is not limited to the following embodiments without departing from the scope of the present invention. In the following description, term "part" and symbol "%" are mass criteria unless otherwise specified.

Preparation of Resin Aqueous Solution A

A random copolymer of styrene/n-butyl acrylate/acryl acid=23/37/37 having an acid value of 288 mg KOH/g, a weight average molecular weight of 10,000 and a monomer composition, was neutralized to one equivalent amount by potassium hydroxides, which then is prepared by water such that a concentration of resin becomes 10.0%, thus obtaining a resin aqueous solution A.

Preparation of Resin Aqueous Solution B

A resin aqueous solution B was prepared similarly to the resin aqueous solution A, except for the use of a random copolymer of styrene/n-butyl acrylate/acryl acid=23/37/37 having an acid value of 288 mg KOH/g, a weight average molecular weight of 10,000 and a monomer composition, instead of the random copolymer of styrene/acryl acid having an acid value of 200 mg KOH/g and a weight average molecular weight of 10,000 which is used for the resin aqueous solution A.

Preparation of Pigment Dispersions 1 to 4

Pigment dispersions 1 to 4 were prepared by the following steps. <Preparation of Pigment Dispersion 1 Including C.I. Pigment Red 122>

10 parts of a pigment (C.I. pigment red 122), 20 parts of the resin aqueous solution A and 70 parts of the ion-exchanged water were mixed and dispersed for three hours by use of a batch vertical sand mill. Then, coarse particles were removed by a centrifugal process. Further, this was press-filtered through a cellulose acetate filter (produced by ADVANTEC) having a pore size of 3.0 µm, thus obtaining pigment dispersion 1 containing a pigment concentration of 10 mass %.

<Preparation of Pigment Dispersion 2 Including C.I. Pigment Blue 15:3>

10 parts of a pigment (C.I. pigment blue 15:3), 20 parts of the resin aqueous solution A and 70 parts of the ion-exchanged water were mixed and dispersed for 5 hours by use of the batch vertical sand mill. Then, coarse particles were removed by a centrifugal process. Further, this was press-filtered through the cellulose acetate filter (produced by ADVANTEC) having a pore size of 3.0 μm, thus obtaining pigment dispersion 2 containing a pigment concentration of 10 mass %.

<Preparation of Pigment Dispersion 3 Including C.I. Pigment Yellow 74>

10 parts of a pigment (C.I. pigment yellow 74), 20 parts of the resin aqueous solution A and 70 parts of the ion-exchanged water were mixed and dispersed for one hour by use of the batch vertical sand mill. Then, coarse particles were removed by a centrifugal process. Further, this was press-filtered through the cellulose acetate filter (produced by ADVANTEC) having a pore size of 3.0 μm, thus obtaining pigment dispersion 3 containing a pigment concentration of 10 mass %.

<Preparation of Pigment Dispersion 4 Including C.I. Pigment Black 7>

10 parts of a carbon black pigment (C.I. pigment black 7), 20 parts of the resin aqueous solution A and 70 parts of the ion-exchanged water were mixed and dispersed for three hours by use of the batch vertical sand mill. The peripheral speed of dispersion was set twice the peripheral speed at which the pigment dispersion 1 was prepared. Then, coarse particles were removed by a centrifugal process. Further, this was press-filtered through the cellulose acetate filter (produced by ADVANTEC) having a pore size of 3.0 μm, thus obtaining pigment dispersion 4 containing a pigment concentration of 10 mass %.

Preparation of Clear Ink

The respective components shown in Table 1 were mixed and stirred well. Then, the mixture was press-filtered through the cellulose acetate filter (produced by ADVANTEC) having a pore size of 0.8 μm, thus preparing color inks 1 to 7 and clear ink.

The composition of the clear ink CL is not limited to the above. The clear ink CL is ink for covering pigment colorants remaining on the paper surface to lessen bronzing, and therefore may differ in type of the resin and the additive amount of resin if the same advantageous effects can be offered.

First Embodiment

A first embodiment of the present invention relates to a technique for lessening the difference in hue angle between a print color of an image to be printed and a bronzing color by use of the clear ink to suppress degradation in print-image quality caused by the difference between the bronzing color and the original print color. Specifically, the contents of the table used in color conversion are defined such that the data value on the clear ink is determined so that the hue angle is minimum with respect to the data value on ink of each color.

Figure 7:
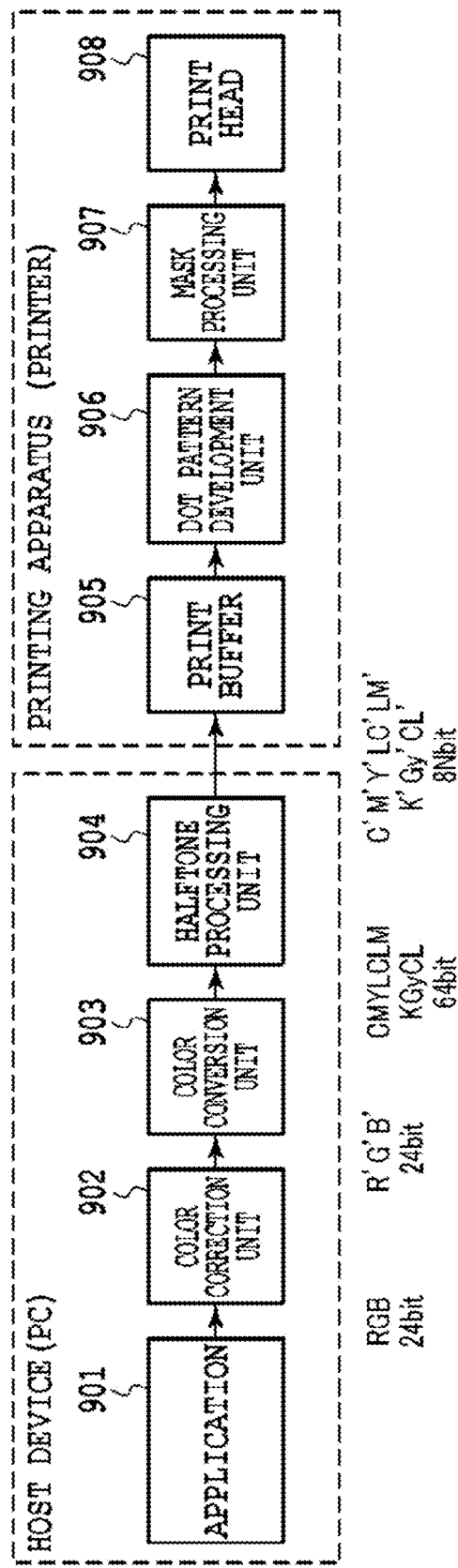
FIG. 7 is a block diagram showing the structure of image processing in the inkjet printing apparatus and a host device according to an embodiment of the present invention.

FIG. 7 is a block diagram showing the configuration for image processing in the inkjet printing apparatus and the host device according to an embodiment of the present invention. FIG. 7 shows an application 901 on a personal computer (PC) which is the host device. Image data of RGB each having 8-bit, that is, in total of 24-bit, is input to a color correction unit 902 from the application 901. The color correction unit 902 converts the input RGB data to different R', G' and B' data, and mainly performs the processing of converting a color gamut which can be reproduced from the RGB data to a color gamut which can be reproduced by the printing apparatus. The conversion processing is performed typically by use of a three-dimensional LUT (Look UP Table) and an interpolation operation. A plurality of types of LUT table contents are prepared in accordance with types of color correction, so that the LUT table contents can be selected or set as appropriate by user's selection or setting of the application. For example, when output of a photographic image is requested, a photo-type LUT is used, and when output of a graphic image is requested, a graphic-type LUT is selected.

The 24-bit data of R', G', B' output from the color correction unit 902 are input to a color conversion unit 903 where the R'G'B' data (color signal) is converted to ink color data (ink-color signal) used in the inkjet printing apparatus. In the present embodiment, the ink color data includes eight colors of C, M, Y, LC, LM, K, Gy and CL. The color conversion unit outputs signals indicative of 8-bit output data for each color, that is, in total, 64-bit output data of the eight colors. The contents of a conversion table used in the color conversion unit according to an embodiment of the present invention will be described later.

A halftone processing unit 904 performs a pseudo-halftoning process such as error diffusion on the received multilevel signal of each color 8-bit=256 levels to convert the multi level data into N-level data lower than 256 levels. The N levels are values of two to four bits for each color, for example, such as to approximate 3 to 16 levels. In the present embodiment, the

TABLE 1

|  |  | Ink |  |  |  |  |  |  |  |
|---|---|---|---|---|---|---|---|---|---|
|  |  | 1 | 2 | 3 | 4 | 5 | 6 | 7 | 8 |
| Pigment | 1 | 40 | 10 |  |  |  |  |  |  |
| Dispersion | 2 |  |  | 40 | 10 |  |  |  |  |
|  | 3 |  |  |  |  | 40 |  |  |  |
|  | 4 |  |  |  |  |  | 30 | 10 |  |
| Resin Aque. Solution B | 5 |  |  |  |  |  |  |  | 1 |
| Glycerin |  | 5.0 | 5.0 | 5.0 | 5.0 | 5.0 | 5.0 | 5.0 | 5.0 |
| Diethylene glycol |  | 5.0 | 5.0 | 5.0 | 5.0 | 5.0 | 5.0 | 5.0 | 5.0 |
| Polyethylene glycol 1000 |  | 5.0 | 5.0 | 5.0 | 5.0 | 5.0 | 5.0 | 5.0 | 5.0 |
| Surfynol 465 |  | 1.0 | 1.0 | 1.0 | 1.0 | 1.0 | 1.0 | 1.0 | 1.0 |
| Ion-Exchanged Water |  | 44 | 74 | 44 | 74 | 44 | 54 | 74 | 83 |
| Ink Color |  | M | Lm | C | Lc | Y | K | Gy | CL |

N levels are five levels, but the present invention is not limited to this. It is evident that the N levels may be converted to be binary for example.

Figure 8:
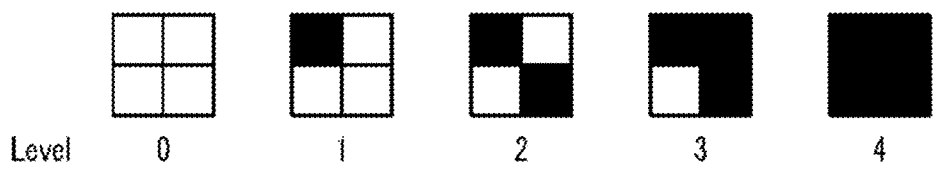
FIG. 8 is a diagram showing dot arrangement patterns for obtaining binary data from N-level data.

The above-described processing units are provided in the host device, and the processing units to be described below are provided in the printing apparatus. Specifically, in the printing apparatus, a print buffer 905 stores N-level data for each ink color subjected to the halftoning process and transmitted from the host device (PC). A dot pattern development unit 906 selects a dot arrangement pattern corresponding to values indicated by the N-level data stored in the print buffer 905, and obtains dot data (binary data) according to the selected arrangement. FIG. 8 illustrates the dot arrangement pattern. As shown in FIG. 8, dot arrangement patterns are determined in accordance with five values (levels) from zero to four represented by the received 5-level data. Specifically, for 2 pixels×2 pixels, printing dot ("1", black-filled pixel) and non-printing dot ("0", white pixel) are determined in every above described five levels. Then, for example, if N=3, the arrangement pattern for level 3 is selected, so that three printing dots and one non-printing dot are obtained as print data of 2 pixels×2 pixels.

Figure 9:
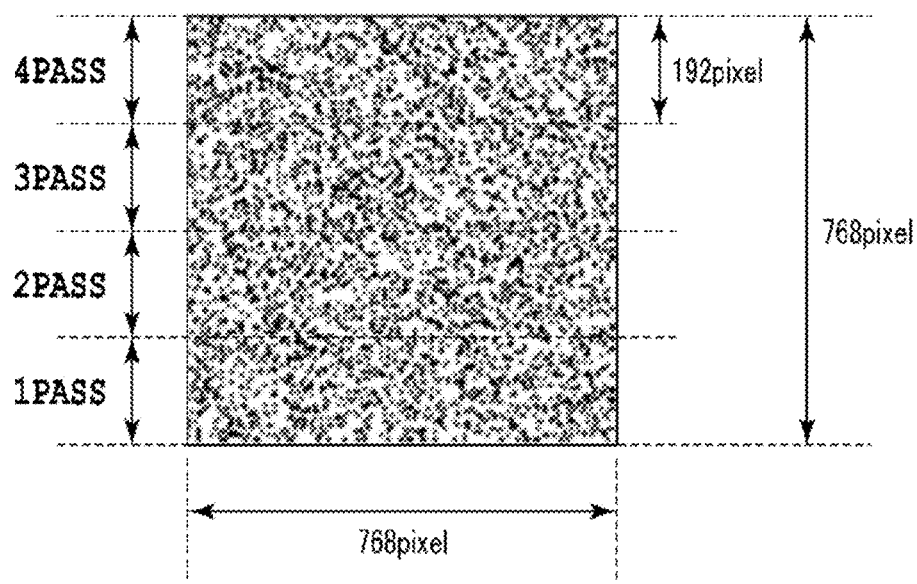
FIG. 9 is a diagram illustrating an example of a mask pattern using an embodiment of the present invention.

A mask processing unit 907 generates print data used in multi-pass printing in which the print head scans the same print area in a plurality of passes to complete the printing for the print area. Specifically, the thinning pattern (hereinafter referred to as the "mask pattern") is used to perform the processing of dividing the print data for the same area into data items respectively corresponding to the plurality of scans. FIG. 9 is a diagram showing an example of the mask pattern. The example of the mask pattern shown in FIG. 9 represents a multi-pass printing mask pattern of four passes in which printing is completed in four scans. In the mask pattern, a mask pixel in which the print data of the corresponding pixel is turned ON is represented by a black dot and a mask pixel in which the print data of the corresponding pixel is turned OFF is represented by a white dot. The lengthwise and widthwise pixels are dimensioned to have 768 pixels×768 pixels, in which the lengthwise direction corresponds to the direction of the nozzle array of the print head, and the widthwise direction corresponds to the scan direction of the print head. The 768-pixel dimension in the lengthwise direction corresponds to the nozzle number, that is, 768 nozzles, of the print head. As shown by the broken line in FIG. 9, the 768-pixel dimension in the lengthwise direction is divided into four, 192-pixel dimensions, resulting in a mask pattern composed of one to four passes which are complementary to each other. In the present example, in the mask pattern composed of one to four passes, the duty which is a ratio of mask pixels in which the print data is turned ON is approximately equal, that is, about 25% duty.

FIG. 10 is a diagram illustrating the multi-pass printing operation using the mask pattern shown in FIG. 9. FIG. 10 shows the print heads 1201 to 1204 (which in the present figure, are described by use of one print head for one color for simplification). In FIG. 10, when the multi-pass printing of four passes is performed, the print paper is conveyed sequentially on a scan basis by a nozzle pitch corresponding to one fourth of a nozzle array on the print head, in which the location of the print head is shifted relatively to the same area of the print paper. FIG. 10 shows mask patterns 1205 to 1209 corresponding to the nozzle arrays on the print head in parallel with the relative movement of the print head. Focusing attention on a print area in which printing is to be completed (the hatched region in FIG. 10), in the first scan (first pass; N+1 pass), printing is performed based upon the print data thinned by the region for the first pass of the mask pattern (see FIG. 9). Then, in the second scan (second pass; N+2 pass), printing is performed based upon the print data thinned by the region for the second pass of the mask pattern, by use of nozzles shifted by a one-fourth nozzle pitch to the nozzles used in the first pass. From then on, the third scan and the fourth scan are likewise performed to complete the printing.

Next, a description will be given of a color conversion table using the clear ink in accordance with a hue difference between a print color and a bronzing color, according to the first embodiment of the present invention.

Figures 11A, 11B:
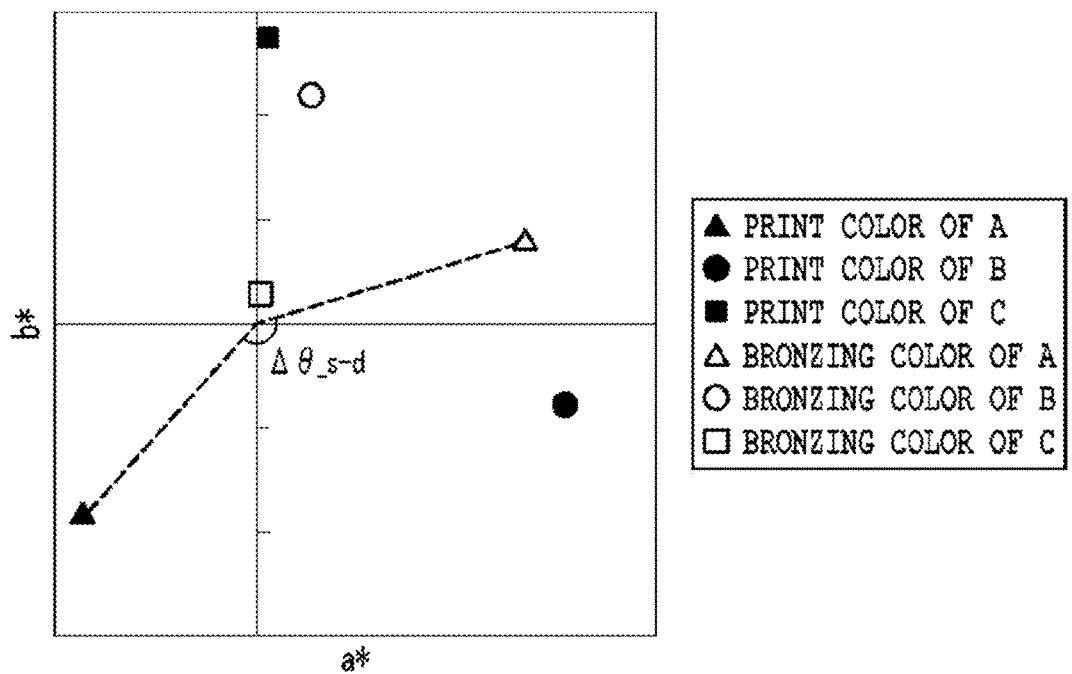
FIGS. 11A and 11B are diagrams illustrating an example of the relationship between a bronzing color and a print color of a printed material measured by the measurement system described in FIG. 2.

Initially, the relationship between a print color and a bronzing color of a printed material when the color inks alone, that is, inks other than the processing ink, is used in printing will be described. FIG. 11A and FIG. 11B are diagrams illustrating an example of the relationship between the bronzing color and the print color of a printed material measured by the measurement system described in FIG. 2. Specifically, FIG. 11A and FIG. 11B show color (a*, b*), hue (θs, θd) and hue difference (θs–d) of each of input signals (R, G, B) which are respectively A(0, 64, 64), B(64, 0, 64), C(64, 64, 0). The mainly used color inks in the input signals A to C are the black and gray inks, and in addition thereto, the cyan ink is used in the signal A(0, 64, 64), the magenta ink is used in the signal B(64, 0, 64) and the yellow ink is used in the signal C(64, 64, 0).

As shown in FIG. 11A, in the case of the signal C(64, 64, 0), the hue of the print color is θd=88, and the hue of the bronzing color is θs=80, so that both of them show a yellow color. A difference between the hue angles of them (hue difference) is Δθs–d=8. On the other hand, in the case of the signal A(0, 64, 64), the hue of the print color is a cyan color of θd=226, but the hue of the bronzing color is a magenta color of θs=17, so that a difference between the hue angles is Δθs–d=151. As seen from the above, the hue difference in the signal A(0, 64, 64) is larger than that in the signal C(64, 64, 0). If such a hue difference between the print color and the bronzing color is large, it is perceptible as an undesired bronzing color. In particular, in the signal A(0, 64, 64), a saturation C*_s of the bronzing color is larger than that in the signal C(64, 64, 0), so that an undesired bronzing color becomes distinct.

As described above, the bronzing color is dependent on the type of color ink and the use amount of ink used in response to the input signal value. Visual image quality demonstrates a propensity to be varied by a hue θs and a saturation C*_s of the bronzing color, and a hue difference Δθs–d from the print color.

Next, the relationship between a print color and a bronzing color of a printed material when printing is performed by use of the clear ink in addition to the color inks will be described.

Figure 12:
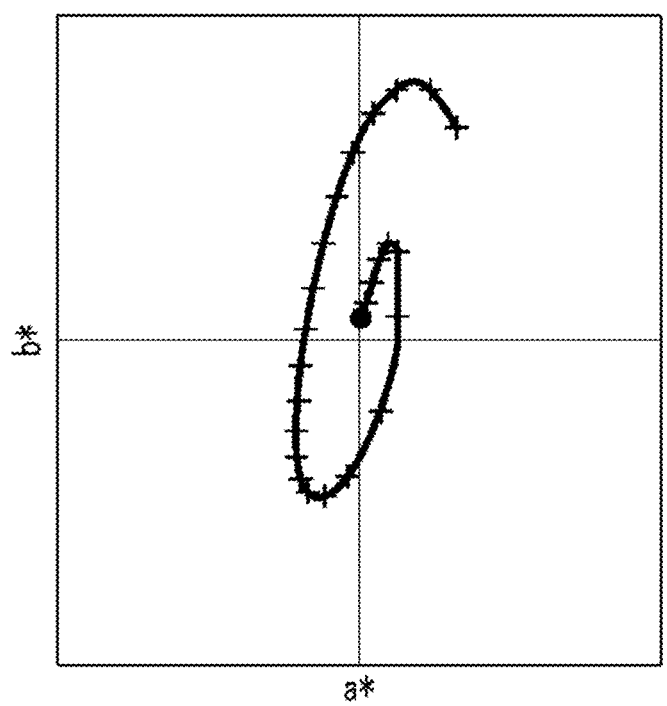
FIG. 12 is a diagram illustrating a change of a bronzing color to the amount of the clear ink in use.

FIG. 12 is a diagram illustrating a change in a bronzing color relative to the use amount of the clear ink. As shown in FIG. 12, with an increase in the use amount of the clear ink printed on the color inks, the bronzing color changes from the bronzing color occurring when the color inks alone are used (the black circle in FIG. 12) while drawing a curve in a clockwise direction.

Figure 13B:
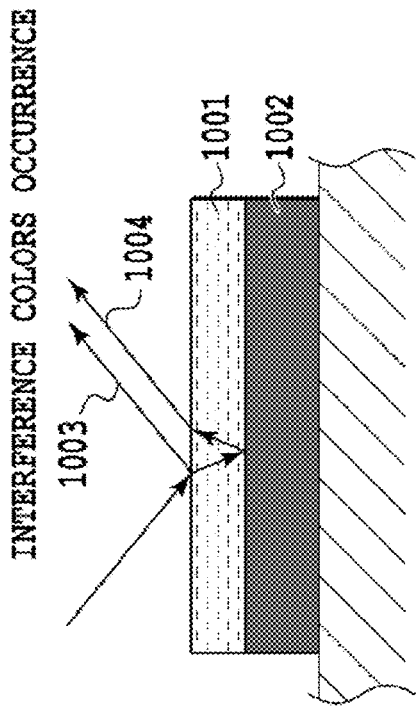
FIGS. 13A to 13D are diagrams illustrating causes of a change of a bronzing color in accordance with the amount of clear ink in use.
Figure 13D:
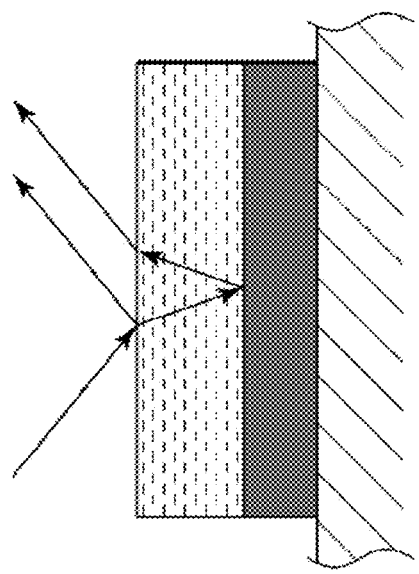
Figure 13A:
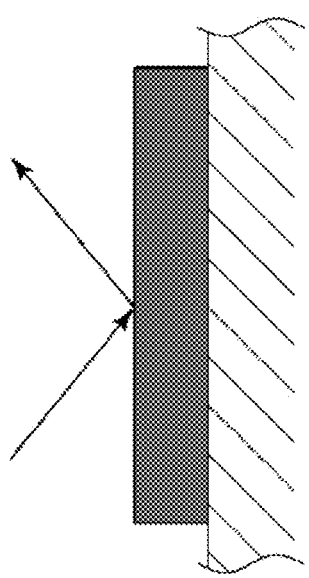
Figure 13C:
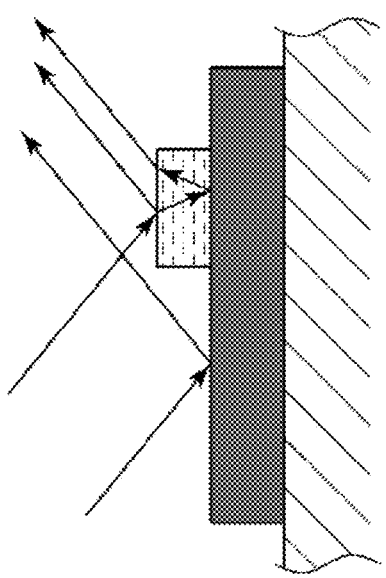

FIG. 13A to FIG. 13D are diagrams illustrating the cause of a change of the bronzing color in accordance with the use of the clear ink. FIG. 13A shows the state of light specularly reflected off the surface of the color ink layer. For simplified description, the light passing through the color ink layer to be reflected off the surface of the print medium is omitted. On the other hand, FIG. 13B shows a case where a clear ink layer is uniformly printed on the color ink layer. In this case, there exist light 1003 reflected off the surface of the clear ink layer 1001, and light 1004 that passes through the clear ink layer

1001, then is reflected off the surface of a cyan color ink layer 1002, and then is emitted from the clear ink layer 1001. Because the light 1004 passes through the clear ink layer 1001, the optical path length of the light 1004 is longer by such an amount than that of the light 1003. A phase shift of light based on the difference in light path length produces so-called interference in which certain wavelengths mutually increase or decrease each other's intensity, resulting in different bronzing colors. If the use amount of the clear ink is changed, the coverage at which the color ink layer is covered with the clear ink and the thickness of the clear ink layer are changed (see FIG. 13C and FIG. 13D). As a result, the interference state changes, resulting in a change in bronzing color.

Therefore in the first embodiment of the present invention, the use amount of the clear ink is employed to control the bronzing color to lessen the hue difference between the bronzing color and the print color with respect to the input signal value, thus preventing the bronzing phenomenon from degrading the image quality.

Figure 14A:
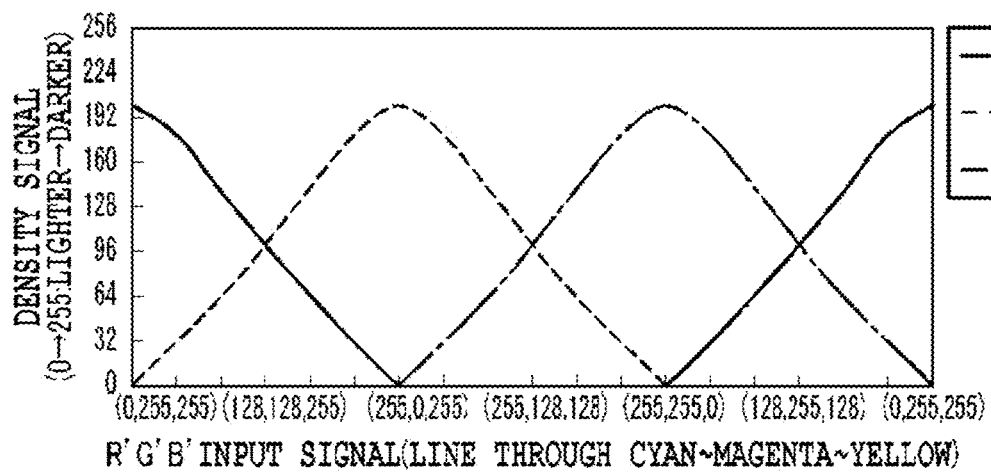
FIGS. 14A to 14C are diagrams illustrating features of color conversion tables in a first embodiment according to the present invention and a comparison example.
Figure 14B:
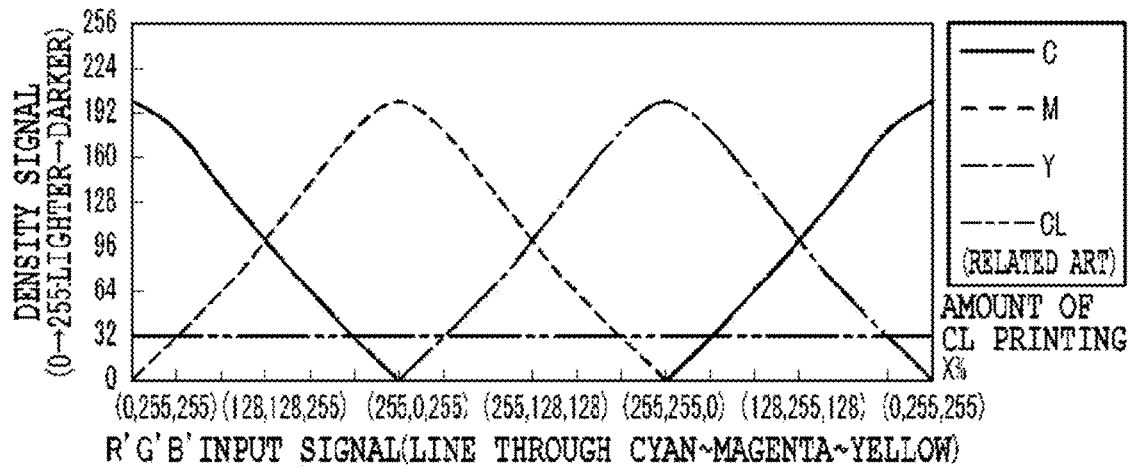
Figure 14C:
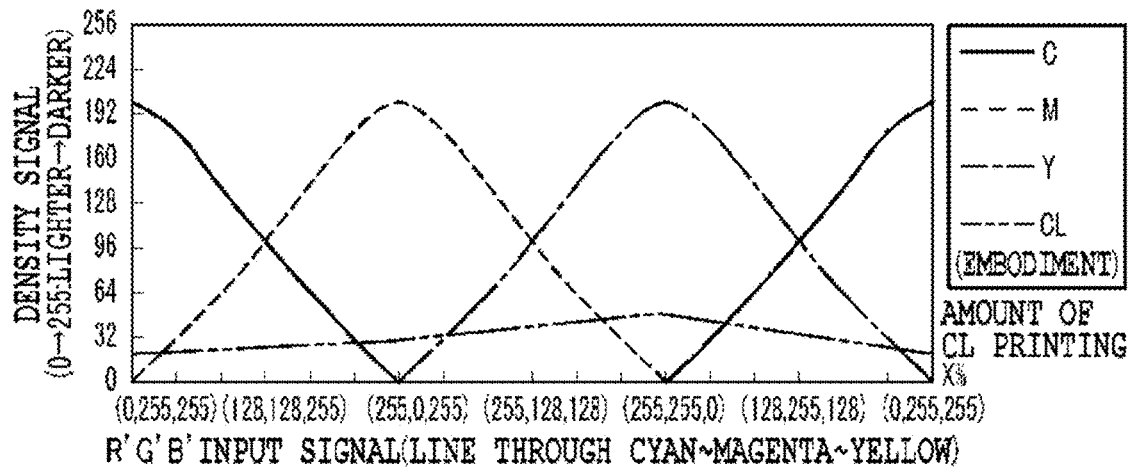

FIG. 14A to FIG. 14C are diagrams illustrating features of the color conversion tables according to the present embodiment, and showing the contents of the color conversion tables including the relationship between input signal values and use amounts of ink. FIG. 14A is a diagram illustrating an example of a related-art color conversion table using the color ink without using the clear ink, for purpose of comparison with the color conversion table in the present embodiment. FIG. 14A shows the relationship of output values of ink color data showing the use amount of ink (vertical axis) with respect to respective colors on a line passing through cyan (0, 255, 255), magenta (255, 0, 255) and yellow (255, 255, 0) corresponding to the input signal values R', G', B' (lateral axis). In the actual contents of the table, the ink color data are related to grid points for the cyan (0, 255, 255), magenta (255, 0, 255) and yellow (255, 255, 0). When the input signal value corresponds to a color between the grid points, an output value of the ink color data for the color is determined by interpolation.

FIG. 14B is a diagram showing the content of a color conversion table when, in the color conversion table of only the color ink shown in FIG. 14A, the use amount of the clear ink (CL amount) is set to X (%), that is, X=constant, irrespective of the input signal value.

Figure 15:
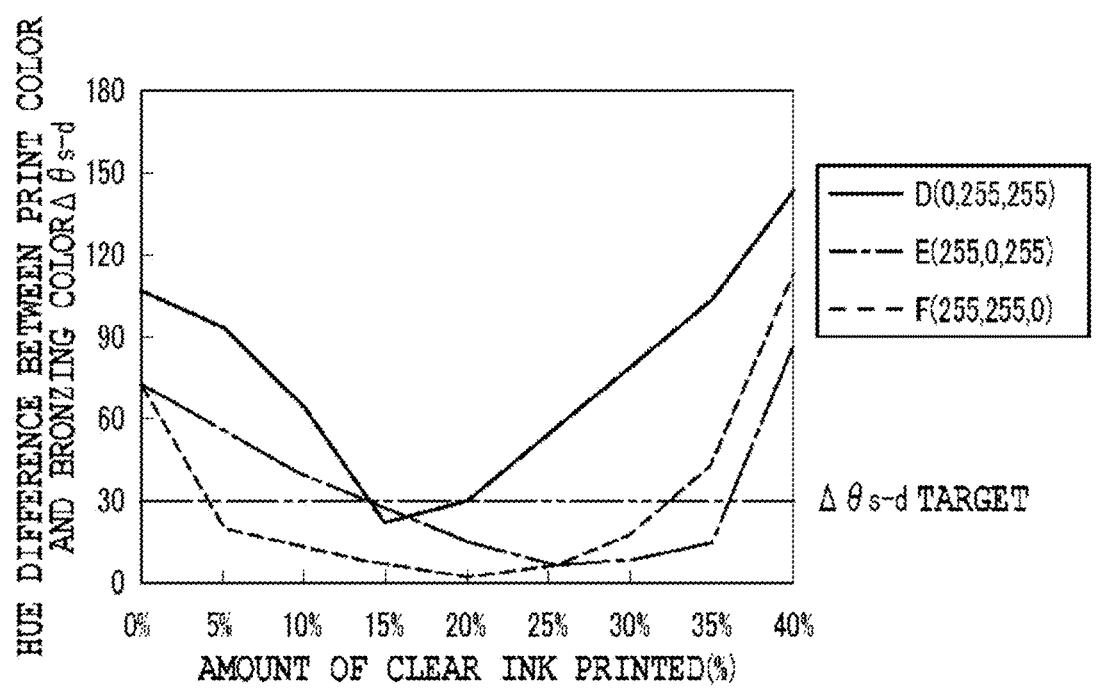
FIG. 15 is a diagram illustrating a bronzing color on a printed material when a color conversion table with a constant amount of CL shown in FIG. 14B is used for printing.

FIG. 15 is a diagram illustrating a bronzing color on a printed material when the color conversion table with a constant amount of CL shown in FIG. 14B is used for printing. FIG. 15 shows a hue difference between a print color and a bronzing color when the color conversion table shown in FIG. 14B is used to perform printing based on output values of color inks and a clear ink corresponding to input signal values D(0, 255, 255), E(255, 0, 255) and F(255, 255, 0) in each of the cases of a constant use amount of the clear ink being set as X=0%, 5%, 10%, . . . , 40%. Here, assume that a target value of a hue difference $\Delta\theta s{-}d$ ranges $\Delta\theta s{-}d{\leq}30$ as an example. A target value of a hue difference $\Delta\theta s{-}d$ is a value which is hard to perceive degradation in image quality caused by different bronzing colors, and is equal to or less than a predetermined value, specifically, preferably equal to or less than 90 degrees, particularly, equal to or less than 30 to 40 degrees. In this case, it is desirable that the use amount of clear ink is equal to or less than 40%, because the print medium is concerned about failure to absorb the clear ink depending on a type of the print medium.

As shown in FIG. 15, when the use amount of the clear ink is 0% (in the case of the color version table using the color ink alone shown in FIG. 14A), a hue difference $\Delta\theta s{-}d$ from each of the colors D, E, F corresponding to the input signal values falls outside a target range. However, a hue difference $\Delta\theta s{-}d$ from the color corresponding to each input signal value can be made to fall within the target range by performing printing when the clear ink is used in a range from 15% to 20% for the color D(0, 255, 255), in a range from 15% to 35% for the color E(255, 0, 255) and in a range from 5% to 30% for the color F(255, 255, 0).

In the present embodiment, in the relationship shown in FIG. 15, the use amount of the clear ink is set such that a hue difference $\Delta\theta s{-}d$ from each of the colors corresponding to the input signal values becomes smallest. As shown in FIG. 15, the use amount of the clear ink realizing a smallest hue difference $\Delta\theta s{-}d$ is varied depending on the use amount of the color ink used for the color corresponding to the input signal value. For example, for the color D(0, 255, 255), the use amount of the clear ink allowing a smallest hue difference $\Delta\theta s{-}d$ is 15%, but it is 25% for the color E(255, 0, 255) and 20% for the color F(255, 255, 0). The colors E and F require a lager amount of clear ink than the color D(0, 255, 255).

To address it, the present embodiment uses the color conversion table in which the use amounts of the clear ink are varied from one color represented by the input signal value to another. Specifically, a minimum use amount of the clear ink allowing a hue difference $\theta s{-}d$ to fall into $\Delta\theta s{-}d{\leq}30$ within a target range is determined for each color shown by a grid point of a color conversion table. Thus, a color conversion table including output values of the determined use amounts and ink color data corresponding to the determined use amounts is set. Such relational color conversions are performed to recognize a bronzing color as a color close to the print color. As a result, undesired bronze is lessened, making it possible to suppress degradation in image quality.

In the above example, the use amount of the clear ink realizing a smallest hue difference $\Delta\theta s{-}d$ is set for each of colors represented by the input signal values, but the present invention is not limited to this aspect. For example, the use amount can be determined such that a hue difference $\Delta\theta s{-}d$ is within the range of the target value described in FIG. 15 and also X % of the use amount of the clear ink becomes smallest. In the example shown in FIG. 15, for example, when the range of the target value is $\Delta\theta s{-}d{\leq}30$, the X % is 15% for the color D(0, 255, 255) of the input signal value, 15% for the color E(255, 0, 255) and 5% for the color F(255, 255, 0). Alternatively, it is assumed that as a case where the use amount of the clear ink can be further reduced, the range of the target value is $\Delta\theta s{-}d{\leq}40$. Then, the X % is 15% for the color D(0, 255, 255), 10% for the color E(255, 0, 255) and 5% for the color F(255, 255, 0).

Next, a printing method in the present embodiment using the aforementioned color conversion table will be described. For achievement of the state of the color ink covered with the clear ink as shown in FIG. 13B, in the printing according to the present embodiment, the clear ink is used after printing of the color ink is completed.

In the present embodiment, as described in FIG. 10, printing is performed by the multi-pass printing process in which a plurality of scans are performed on the same image area to complete the printing to the image area. Specifically, in regard to the mask pattern for dividing the image data into the plurality of scans, the different mask patterns are used for the color ink and the clear ink to achieve printing of the clear ink after the color ink has been printed.

FIG. 16A and FIG. 16B are diagrams respectively showing an example of the mask pattern used in the printing of the color ink and an example of the mask pattern used in the printing of the clear ink. Each of the mask patterns is a pattern for the multi-pass printing of four passes. The color-ink mask pattern shown in FIG. 16A is a pattern for completing printing in the first pass and the second pass. Specifically, a ratio of mask pixels (duty) in which the print data is turned ON is 50% in the first pass, 50% in the second pass, and 0% in the third and fourth passes. On the other hand, the clear-ink mask pattern shown in FIG. 16B is a pattern for completing printing in the third pass and the fourth pass. Specifically, a ratio of mask pixels (duty) in which the print data is turned ON is 0% in the first and second passes, 50% in the third pass, and 50% in the fourth pass.

Figure 18B:
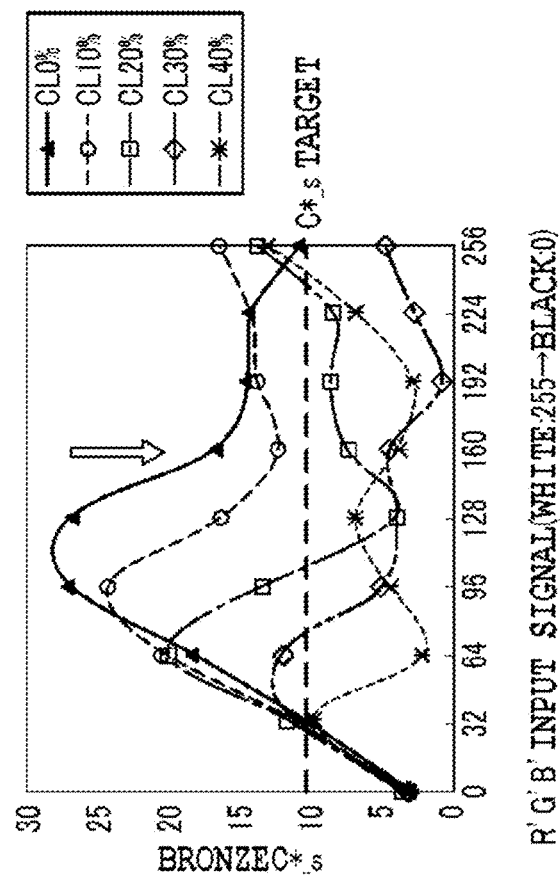
FIGS. 18A and 18B are diagrams illustrating variations in bronzing color and a saturation reduction of the bronzing color caused by the clear ink, according to a second embodiment of the present invention.
Figure 18A:
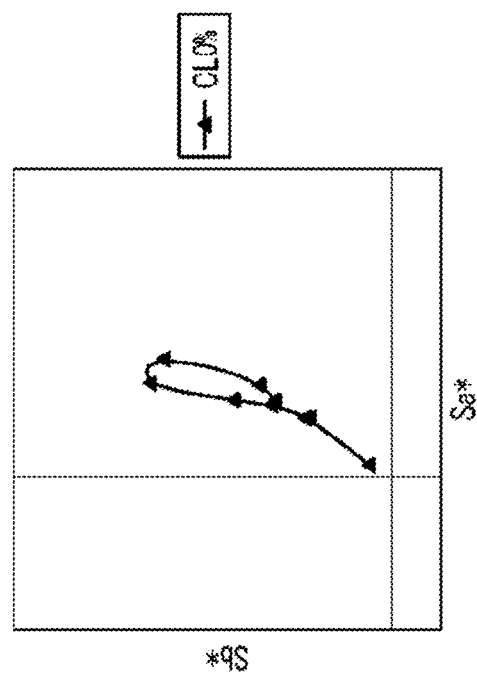

FIG. 17A and FIG. 18A are diagrams illustrating the multipass printing operation using the masks shown in FIG. 16A and FIG. 16B. Specifically, the state in which the location of the print head is shifted relatively to the same area of the print paper on each scan (pass) basis, is shown together with the mask patterns related to the print head.

As shown in FIG. 17A, in the first (N+1) pass, ink is ejected from the nozzle array for the color ink toward a predetermined print area 2109 on the print medium, based on print data resulting from the thinning of the print data of the area by the mask patter 2105, for printing. Upon completion of the scanning of the one pass, the print medium is conveyed by an amount corresponding to a nozzle array pitch×¼ (the number of nozzles of the nozzle array). Then, in the second (N+2) pass, ink is ejected from the nozzle array for the color ink toward the same predetermined print area 2109 based on print data resulting from the thinning of the print data of the area by the mask patter 2106, for printing.

Upon completion of the printing of the color ink, the print medium is conveyed in a manner similar to the above. Then, as shown in FIG. 17B, in the third (N+3) pass, the clear ink is ejected from the nozzle array for the clear ink toward the predetermined print area 2109 on the print medium based on print data resulting from the thinning of the print data of the area by the mask pattern 2107, for printing. Likewise, in the fourth (N+4) pass, the clear ink is ejected from the nozzle array for the clear ink toward the predetermined print area 2109 on the print medium based on print data resulting from the thinning of the print data of the area by the mask pattern 2108, for printing.

In this manner, the color ink is printed in the two passes in the first half, and then the clear ink is printed in the two passes in the second half. As a result, after the color ink has been fixed on the print medium, the clear ink can be printed on the color ink, thus making it possible to cover the color ink layer as a first layer with the clear ink layer as a second layer, as shown in FIG. 13B, that is, to form a film such that resin covers color materials.

In this printed image, a hue difference in a L*a*b* space is equal to or less than 90 degrees between a print color measured in a reflected light that does not include a specular reflected light and a bronzing color which is the print color measured in a reflected light that includes the specular reflected light, in a case of performing measuring of the printed material under a measuring light source. The printed material may be formed to include a first portion in which a first layer is formed with cyan ink and a second portion which is formed at separate position from the first portion and in which the first layer is formed with gray ink. The printed material desirably has the hue difference of 90 degrees or less at both the first and second portions. The first and second portions in the printed material may include the respective first layers having contact with each other and have a common second layer covering the respective first layers having contact with each other.

As described above, according to the present embodiment, a color conversion table in which the use amount of clear ink is set in accordance with an input signal value is used. As a result, lessening of bronzing which is perceived as being undesired because of a large difference between the bronzing color and the print color is achieved, resulting in suppression of degradation in image quality.

Second Embodiment

In the aforementioned first embodiment, the color conversion table for reducing the hue difference θs−d between a bronzing color and a print color of a printed material is set for lessening the bronzing perceived as being undesired. However, when a color indicated by an input signal value is a color in a low saturation region on or near a gray line (axis), a saturation of the bronzing color is apt to be more perceived as degraded image quality than the hue difference between the print color and the bronzing color. In light of this, a second embodiment of the present invention uses a color conversion table for reducing the saturation C* of a bronzing color, rather than a hue difference Δθa−b between the print color and the bronzing color, when the color indicated by the input signal value is a color in a low saturation region (in this case, the print color exhibits also a low saturation). On the other hand, regarding the color in a high saturation region, the color conversion table having the features described in the first embodiment is used. Specifically, in the present embodiment, the color conversion table using the gray line as the low saturation region will be described. It should be noted that the predetermined low saturation region may be defined as the gray line and a region in the proximity of the gray line as described above, and the extent to which the proximity area occupies can be defined, for example, as a range in which a bronzing color obtained by actually performing printing is perceived as being undesired.

FIG. 18A and FIG. 18B are diagrams for illustrating variations of the bronzing color and a reduction in saturation of the bronzing color by the clear ink. Specifically, the variations of the bronzing color are shown when a color indicated by an input signal value changes on the gray line from a white point W(255, 255, 255) to a black point K(0, 0, 0).

Among them, FIG. 18A shows the bronzing color on the gray line in positions (color) on the a*b* plane when the clear ink is not used. As shown in FIG. 18A, the bronzing color on the printed material on which the color ink alone is printed is positioned in a region of approximately a*>0 and b*>0. This is because a black ink and a gray ink mainly used on the gray line have the properties of causing a bronzing phenomenon of a hue from yellow to orange to occur on the printed material.

FIG. 18B is a diagram showing the saturation of the bronzing color on the gray line, in which the saturations when the use amounts of the clear ink are set to 0%, 10%, 20%, 30% and 40% are respectively shown. Among them, a solid line formed by connecting black triangular symbols shows the case of using no clear ink (0%) for the saturation $C^*\_s$ of a bronzing color on the gray line. In this case, $C^*\_s \leq 10$, which is a range of a target value of saturation $C^*\_s$ in which the bronzing color is not perceived as being undesired, cannot be satisfied.

On the other hand, as shown by a dashed line (10%) in FIG. 18B, the use of clear ink causes a reduction in bronzing saturation. Then, when the use amount of clear ink is 20% to 40%, the saturation of bronzing can be reduced so as to measure up to the range of the target value. In the present embodiment, the use amount of the clear ink in the gray line is determined within the target range and to reduce the use amount of the clear ink, which is then reflected in the color conversion table. The amount of the clear ink is set to zero for the white point W because the bronzing phenomenon is not produced by the color ink.

Figure 19:
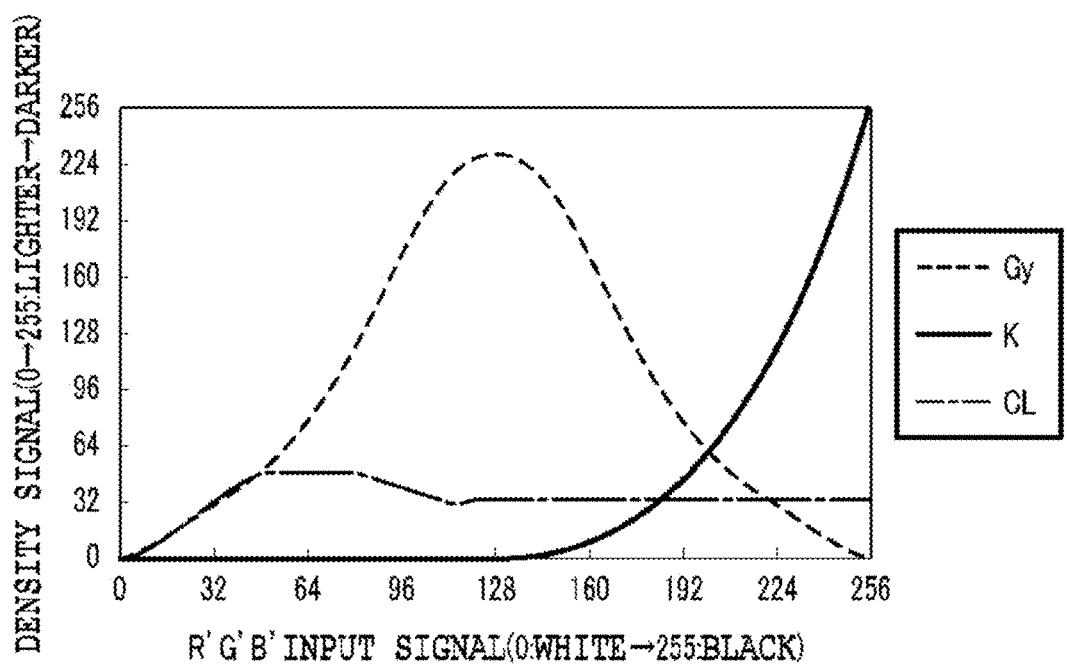
FIG. 19 is a diagram showing a color conversion table according to the second embodiment.

FIG. 19 is a diagram showing the color conversion table according to the present embodiment, specifically, showing the use amounts of the color ink and the clear ink for colors on the gray line. As shown in FIG. 19, the color conversion table according to the present embodiment uses basically a black ink (K) and a gray ink (Gy) to reproduce a color on the gray line. As described in relation to FIG. 18B, the clear ink is further used to reduce the saturation C* of the bronzing color when the color on the gray line is printed. This makes it possible to prevent degradation in image quality caused by bronzing on the printed material from being not easily perceived. The printing operation based on the print data obtained from the color conversion table is performed in a manner similar to the case described in FIG. 17A and FIG. 17B in the first embodiment.

In the above examples, the color conversion table of colors on the gray line is described. However, a gray line and a predetermined low saturation region near the gray line may be set as the color conversion table described earlier. This makes it possible to provide a printed material in which the bronzing color is advantageously lessened.

Third Embodiment

Next, a third embodiment of the present invention will be described. Matters other than features of the present invention which will be described below are the same as those in the first or the second embodiment. In the third embodiment of the present invention, with consideration given to the relationship of hues of bronzing colors ($\theta 1s$, $\theta 2s$) between colors represented by a plurality of input signal values, a color conversion table is set such that a hue difference ($\Delta \theta 1s-2s$) of the bronzing colors is lessened.

In a low lightness region around the maximum darkness, if a plurality of bronzing colors of the print colors in this region differ from each other, degradation in image quality may possibly be perceived as undesired bronzing.

To address this, the present embodiment sets a color conversion table for lessening a hue difference ($\Delta \theta Is-Ks$) between a bronzing color of a printed material in the maximum darkness, that is, a black point K (0, 0, 0) indicated by an input signal value, and a bronzing color of the printed material represented by an input signal value I indicating a color around the maximum darkness. In the present embodiment, first, it is assumed that the low lightness region is a region where the R', G', B' input signal values are R'≤64 or G'≤64 or B'≤64. Regarding regions except for the low lightness area, the color conversion table including the content described in the first embodiment or the second embodiment is set. However, in the present embodiment, when the low lightness region defined as described above corresponds to the low saturation region described in the second embodiment, the region except for the gray line (line in which the R' G' B' input signal values are equal) corresponds to the color conversion table including the content according to the present embodiment, which will be described below.

Figure 20:
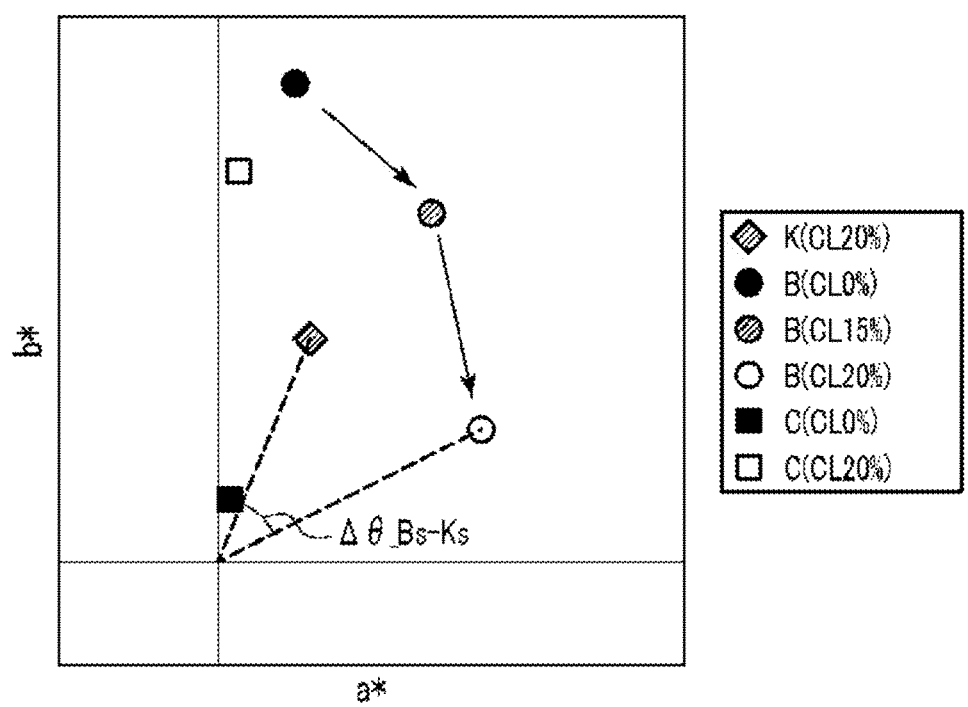
FIG. 20 is a diagram showing a bronzing color of an input signal value and a block point on the a*b* plane, according to a third embodiment of the present invention.

FIG. 20 is a diagram showing the bronzing colors of the input signal values and the black point on the a*b* plane according to the present embodiment. Specifically, the bronzing colors of the colors B(64, 0, 0) and C(0, 0, 64) indicated by the input signal values and the black point K(0, 0, 0) are shown. In FIG. 20, a diamond shape symbol denotes a bronzing color when the use amount of the clear ink CL is set to 20% for the black point K (0, 0, 0). On the other hand, square symbols denote bronzing colors respectively when the use amount of the clear ink CL is set to 0% and 20% for the color C(0, 0, 64). The hues of the bronzing colors are not much different from each other between when the use amount of the clear ink CL is set to 0% and 20%.

On the other hand, circle symbols in FIG. 20 denote bronzing colors when the use amount of the clear ink CL is set to 0%, 15% and 20% for the color B(64, 0, 0) represented by the input signal value. In the case of the color B, as seen from FIG. 20, a change in hue of the bronzing color is greater by the use amount of the clear ink. In the present embodiment, a color conversion table is set such that the use amount of the clear ink CL for B (64, 0, 0) is set to 15% in order to bring such a color close to the hue of the bronzing color of the black point K(0, 0, 0).

In this manner, the use amount of the clear ink is determined such that the difference in hue between a bronzing color of a printed material at a block point and a bronzing color of a color of a printed material indicated by input signal values around the black point is made small. As a result, it is possible to suppress degradation of image quality caused by bronzing in the vicinity of the maximum darkness.

Fourth Embodiment

A fourth embodiment of the present invention relates to a method of printing a color ink and a clear ink, and to a method of printing the inks in the same pass, instead of printing the color ink and the clear ink in different passes as described in the first embodiment. Matters other than features relating to this printing method are the same as those in the first embodiment. In the first embodiment, the pass for printing the color ink is completely separated from the pass for printing the clear ink. However, in the method of completely separating the passes, the number of passes for the color ink is decreased, so that the multi-pass advantageous effects, that is, the effects of reducing variations and streaks produced by conveyance errors and ejection failures may possibly be lost. To avoid this, in the present embodiment, in the case of printing completed by four passes, a mask pattern is determined such that a duty for the color ink becomes 40% in the first pass, 30% in the second pass, 20% in the third pass and 10% in the fourth pass. Further, for the clear ink, a duty becomes 10% in the first pass, 20% in the second pass, 30% in the third pass and 40% in the fourth pass.

Figure 21:
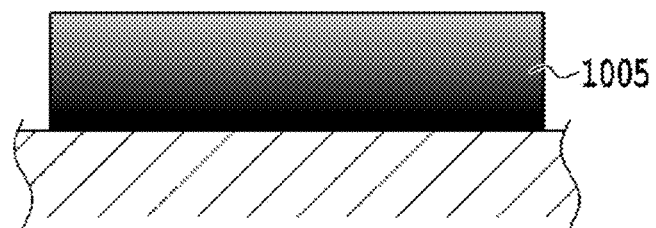
FIG. 21 is a schematic diagram showing a state of a color ink layer and a clear ink layer on the surface of the printed material according to a third embodiment.

FIG. 21 is a schematic diagram showing the state of the color ink layer and the clear ink layer on the surface of the printed material. FIG. 13B shows the print state when the pass for printing the color ink is separated from the pass for printing the clear ink in the first embodiment, whereas FIG. 21 shows the print state when the color ink and the clear ink are printed in the same pass in the fourth embodiment. In the state in FIG. 13B, the color ink layer and the clear ink layer is separated, that is, the color material and the resin are separated to form a layer structure. However, a layer 1005 shown in FIG. 21 includes color materials and resin in a mixed manner. The coverage at which the color materials are covered with the resin in the state in FIG. 21 is lower than the case of that in FIG. 13B. However, the color material is partially covered, so that the printing of the clear ink makes it possible to change the bronzing color.

As described above, by the printing method using the mask pattern for printing the color ink and the clear ink in the same pass in an overlapping manner, although a change in the bronzing color to the use amount of the clear ink is lessened as compared with the case in the first embodiment, lessening of bronzing can be controlled. Also in a printed image by this embodiment, a hue difference in a L*a*b* space is equal to or less than 90 degrees between a print color measured in a reflected light that does not include a specular reflected light and a bronzing color which is the print color measured in a reflected light that includes the specular reflected light, in a case of performing measuring of the printed material under a measuring light source.

Further, also in the printed image by this embodiment, the printed material may be formed to include a first portion that is formed in a mixture with cyan ink and clear ink for example and a second portion that is formed at a separated position from the first portion and is formed in a mixture with gray ink and clear ink for example.

Fifth Embodiment

A fifth embodiment of the present invention relates to a method of identifying a bronzing color, in which, differing from the first embodiment, regarding light reflected off a printed material after being incident on the printed material from a plurality of directions, the reflected light including specular reflected light and the reflected light without specular reflected light are measured to determine a bronzing color and a print color. Matters other than this evaluation method are the same as those in the first embodiment.

Figure 1:
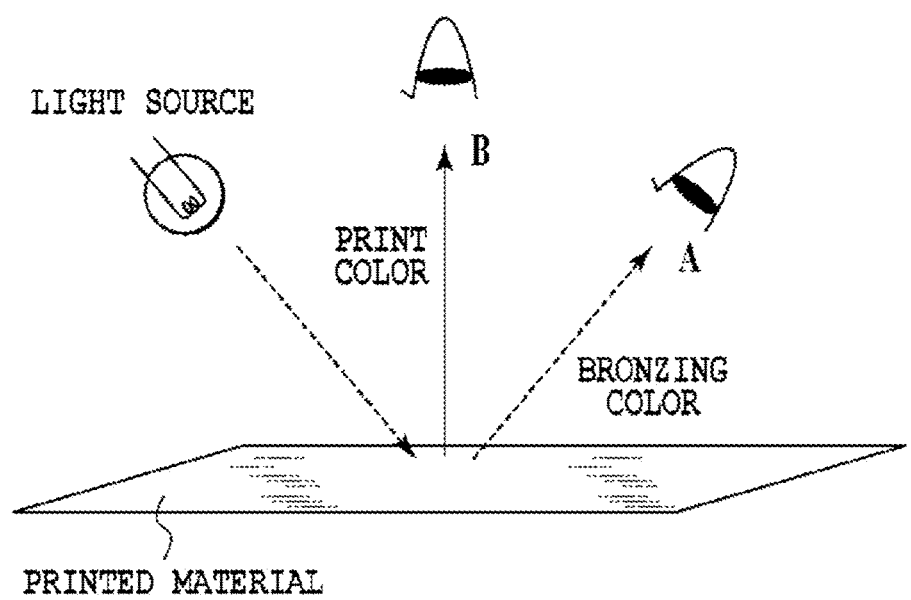
FIG. 1 is a diagram illustrating two different reflected lights when a printed material is viewed at two different angles.

The first embodiment relates to, as a method of identifying a bronzing color, as shown in FIG. 1, the method of measuring the reflected light which is light entering a printed material from a single direction and then reflected off it, that is, only the specular reflected light. However, the environment in which a printed material is observed is generally an office and the like, in which light is incident on the printed material from various directions. To address this, in the present embodiment, regarding the reflected light which is light incident on the printed material from a plurality of directions and then reflected off it, the reflected light including the specular reflected light and the reflected light not including specular reflected light B' are measured. Based on the result of measurement of the reflected light including the specular reflected light, a bronzing color is identified, and a print color is identified based on the result of measurement of the reflected light without the specular reflected light.

Figure 22A:
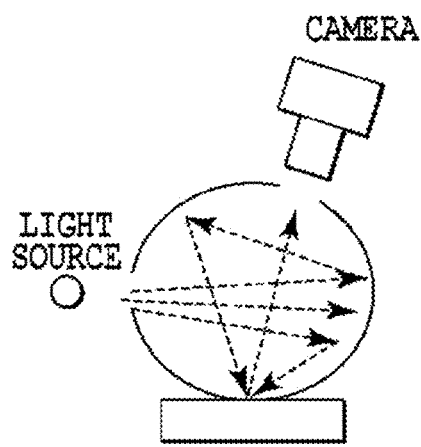
FIGS. 22A and 22B are schematic diagrams of the systems of measuring bronze and measuring a print color according to a fourth embodiment.
Figure 22B:
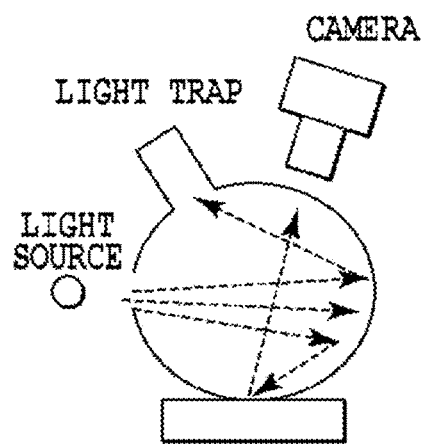

FIG. 22A and FIG. 22B are diagrams illustrating a measurement system used in the present embodiment, which schematically show a spectro-photometric colorimeter (integrating sphere type), produced by Konica Minolta Corp. FIG. 22A shows the state of detecting reflected light including specular reflected light, while FIG. 22B shows the state of having a light trap and detecting the reflected light from which specular reflected light is removed. From spectral intensity of light obtained from the measurement by the measurement system, a saturation $C^*\_s'$ and hue $\theta s'$ of the reflected light including the specular reflected light, and a saturation $C^*\_d'$ and hue $\theta d'$ of the reflected light without specular reflected light are determined by use of bronzing property calculation method described in the first embodiment.

Based on the saturations and hues obtained by use of the measurement device, as in the case of the first embodiment, the use amount of the clear ink is set such that a hue difference between a bronzing color and a print color indicated by the input signal value is made small, thus obtaining a color conversion table.

When the measured value in the present embodiment is applied to the same color conversion table as that in the second embodiment, regarding the color indicated by the input signal value, a saturation $C^*\_d'$ of a print color and a saturation $C^*\_s'$ of a bronzing color are determined as measurement results in the present embodiment. Then, the use amount of the clear ink is set to reduce the difference between the saturation $C^*\_d'$ of the print color and the saturation $C^*\_s'$ of the bronzing color in the print color determined.

In the actual observation of the printed material, reflected light resulting from a mixture of the reflected light including the specular reflected light and the reflected light excluding the specular reflected light is observed. Because of this, for example, assignment of weights to the value $C^*\_s'$ of the saturation of the reflected light including the specular reflected light, and the like may be possible for agreement between visual colors and actual colors of the printed material.

Other Embodiment

In the first to fourth embodiments, processing units up to the halftone processing unit 904 of the image processing shown in FIG. 7 are configured in the host device, and the remaining processing units are configured in the inkjet printing apparatus. However, the color conversion unit 903 relating to the present invention and the processing units after it may be configured in the inkjet printing apparatus. Alternatively, all the processing units for the image processing up to the mask processing unit 907 may be configured in either the host device or the printing apparatus. Any of the host device and the inkjet printing apparatus, which are in the aforementioned forms, forms an image processing unit.

In the first to fourth embodiments, the clear ink containing resin but containing no color material is used. However, the ink is not necessarily required to be limited to ink not containing a color material. In the grayscale ink system including a cyan system, magenta system and gray system which are typically used in the color ink, resin can be added to tint ink, thereby using the tint ink instead of the clear ink. In the present specification, the inks are called processing ink including the clear ink. However, if the present invention is carried out using other hues, various adjustments, such as setting a lower concentration of color materials of tint ink, adjustment of the use amount of ink and the like, are necessary so as to prevent the color materials of tint ink including a large amount of resin from affecting reproduction of original colors.

Color materials of ink are not limited to pigment, and dyes may be used as the color materials.

In addition, the present invention is implemented by performing the following processing. That is, software (program) implementing the functions of the aforementioned embodiments is provided to a system or a device through a network or various recording media, and then a computer (or CPU, MPU or the like) of the system or device reads the program to perform the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-214848, filed Sep. 29, 2011, which is hereby incorporated by reference herein in its entirety.

What is claimed is:

1. An image processing apparatus for forming an image by a predetermined color of ink and a clear ink that is a clear material and includes a resin, the predetermined color of ink and the clear ink being applied to a print medium with use of an applying unit, said apparatus comprising:
- a determining unit configured to determine applying amounts of the ink and the clear ink to the print medium; and
- a control unit configured to cause the applying unit to apply the ink and the clear ink to the print medium, based on the applying amounts determined by said determining unit,
- wherein said determining unit determines the applying amounts so that a hue difference in a L*a*b* space is equal to or less than 90 degrees between a print color measured in a reflected light that does not include a specular reflected light and a bronzing color which is a print color measured in a reflected light that includes the specular reflected light, in a case of performing measuring of the image under a light, the image being formed by applying a predetermined applying amount of the ink and a predetermined applying amount of the clear ink.

2. The image processing apparatus as claimed in claim 1, wherein the predetermined color of ink is cyan ink.

3. The image processing apparatus as claimed in claim 1, wherein the hue difference is equal to or less than 40 degrees.

4. The image processing apparatus as claimed in claim 1, wherein the hue difference is equal to or less than 30 degrees.

5. The image processing apparatus as claimed in claim 1, wherein the predetermined color of ink includes a first color of ink and a second color of ink, and an applying amount of the first color of ink differs from an applying amount of the second color of ink.

6. The image processing apparatus as claimed in claim 1, wherein forming the image is performed by a plurality of scans to a same area of print medium with a print head that ejects ink as the applying unit for completing printing of the same area,
- said apparatus further comprises a generating unit configured to generate print data for applying ink to the print medium based on the applying amount determined by said determining unit, and
- said generating unit generates print data so that a ratio of the clear ink applied at a later scan is higher than that of the ink other than the clear ink.

7. A storage medium storing a program that is read by a computer to cause the computer to function as said image processing apparatus as claimed in claim 1.

8. An image processing method of forming an image by a predetermined color of ink and a clear ink that is a clear material and includes a resin, the predetermined color of ink and the clear ink being applied to a print medium with use of an applying unit, said method comprising:
- a determining step of determining applying amounts of the ink and the clear ink to the print medium; and
- a control step of causing the applying unit to apply the ink and the clear ink to the print medium, based on the applying amounts determined by said determining step,
- wherein said determining step determines the applying amounts so that a hue difference in a L*a*b* space is equal to or less than 90 degrees between a print color measured in a reflected light that does not include a specular reflected light and a bronzing color which is a print color measured in a reflected light that includes the specular reflected light, in a case of performing measuring of the image under a source, the image being formed by applying a predetermined applying amount of the ink and a predetermined applying amount of the clear ink.

9. A printed image formed by a color ink and a resin material that is clear and includes a resin on a print medium,
- wherein a hue difference in a L*a*b* space is equal to or less than 90 degrees between a color measured in a reflected light excluding a specular reflected light and a color which is a print color measured in a reflected light that includes the specular reflected light, in a case of performing measuring of the image in a unit area of the print medium under a light.

10. The printed image as claimed in claim 9, comprising a first layer formed with a predetermined color of ink; and a second layer formed with the resin material.

11. The printed image as claimed in claim 10, wherein the first layer comprises overlapped layers of a layer of a first color ink and a layer of a second color ink.

12. The printed image as claimed in claim 10, wherein said printed image includes a first portion and a second portion which is formed at a separated position from the first portion, and the hue difference in the L*a*b* space is equal to or less than 90 degrees in a unit area of the first portion and in a unit area of the second portion.

13. The printed image as claimed in claim 9, being formed by a mixture of the color ink and the resin material.

14. The printed image as claimed in claim 13, being formed by a first color ink and a mixture of a second color ink and the resin material.

15. The printed image as claimed in claim 9, wherein the color ink is cyan ink.

16. The printed image as claimed in claim 9, wherein the color ink is gray ink.

17. The printed image as claimed in claim 9, wherein the hue difference is equal to or less than 40 degrees.

18. The printed image as claimed in claim 9, wherein the hue difference is equal to or less than 30 degrees.

19. The printed image as claimed in claim 9, wherein said printed image includes a first portion a first layer of which is formed with a first color ink, and a second portion which is formed at separated position from the first portion and a first layer of which is formed with a second color ink, and the hue difference in the L*a*b* space is equal to or less than 90 degrees in a unit area of the first portion and in a unit area of the second portion.

* * * * *